(12) United States Patent
Mizuno et al.

(10) Patent No.: US 10,017,144 B2
(45) Date of Patent: Jul. 10, 2018

(54) SIDE AIRBAG APPARATUS

(71) Applicant: TOYODA GOSEI CO., LTD., Kiyosu-shi, Aichi-ken (JP)

(72) Inventors: Norio Mizuno, Kiyosu (JP); Yuta Okayama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 36 days.

(21) Appl. No.: 15/244,373

(22) Filed: Aug. 23, 2016

(65) Prior Publication Data

US 2017/0088089 A1 Mar. 30, 2017

(30) Foreign Application Priority Data

Sep. 30, 2015 (JP) .................. 2015-193333

(51) Int. Cl.
| | |
|---|---|
| *B60R 21/231* | (2011.01) |
| *B60R 21/237* | (2006.01) |
| *B60R 21/2334* | (2011.01) |
| *B60R 21/2346* | (2011.01) |
| *B60R 21/233* | (2006.01) |

(52) U.S. Cl.
CPC ...... *B60R 21/23138* (2013.01); *B60R 21/237* (2013.01); *B60R 21/2334* (2013.01); *B60R 21/2346* (2013.01); *B60R 2021/23146* (2013.01); *B60R 2021/23316* (2013.01)

(58) Field of Classification Search
CPC ............ B60R 21/23138; B60R 21/237; B60R 2021/23146

See application file for complete search history.

(56) References Cited

U.S. PATENT DOCUMENTS

| | | | | |
|---|---|---|---|---|
| 2007/0284858 A1* | 12/2007 | Nishimura | ............ | B60R 21/217 280/729 |
| 2007/0284859 A1 | 12/2007 | Kashiwagi | | |
| 2008/0079249 A1* | 4/2008 | Yamamura | ............ | B60R 21/207 280/730.2 |
| 2012/0242067 A1* | 9/2012 | Kino | ..................... | B60R 21/231 280/730.2 |
| 2015/0183393 A1* | 7/2015 | Kino | ..................... | B60R 21/207 280/729 |

(Continued)

FOREIGN PATENT DOCUMENTS

| | | |
|---|---|---|
| JP | 2007-331401 A | 12/2007 |
| JP | 2008-087632 A | 4/2008 |

(Continued)

*Primary Examiner* — James A English
(74) *Attorney, Agent, or Firm* — Posz Law Group, PLC

(57) ABSTRACT

An airbag main body is stored in a storage portion in a storage form and includes an elongated stacked portion. The stacked portion includes a first stacked section, which forms a lower part, and a second stacked section, which forms a part above the first stacked section and accommodates a gas generator. In the storage form, the first stacked section includes a plurality of bent sections arranged along a flowing direction of inflation gas. Among the bent sections, the bent section that is located at the most downstream position in the inflation gas flowing direction is a downstream bent section. Among the bent sections, at least the downstream bent section is arranged behind the second stacked section.

12 Claims, 11 Drawing Sheets

(56) References Cited

U.S. PATENT DOCUMENTS

| | | | |
|---|---|---|---|
| 2016/0096504 A1* | 4/2016 | Fujiwara | B60R 21/23138 |
| | | | 280/729 |
| 2016/0200280 A1* | 7/2016 | Fujiwara | B60N 2/42 |
| | | | 280/729 |
| 2016/0264091 A1* | 9/2016 | Fujiwara | B60R 21/2346 |
| 2017/0008481 A1* | 1/2017 | Hotta | B60R 21/23138 |
| 2017/0028958 A1* | 2/2017 | Goto | B60R 21/233 |

FOREIGN PATENT DOCUMENTS

| | | | | |
|---|---|---|---|---|
| WO | WO-2015045613 A1 * | 4/2015 | | B60N 2/42 |
| WO | WO-2015075984 A1 * | 5/2015 | | B60R 21/2346 |

* cited by examiner

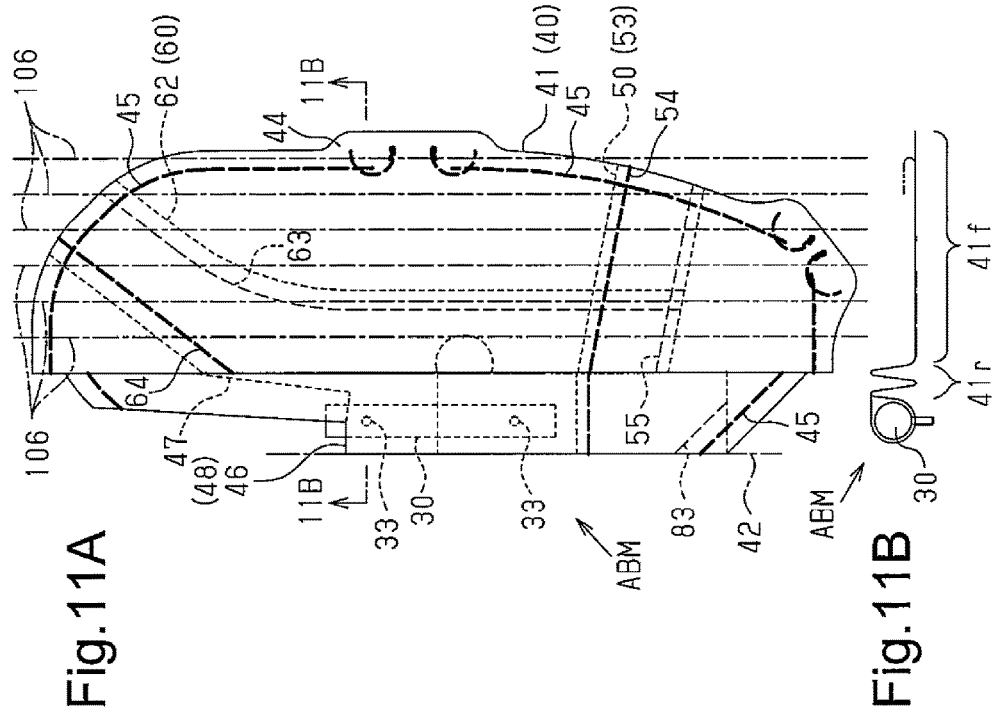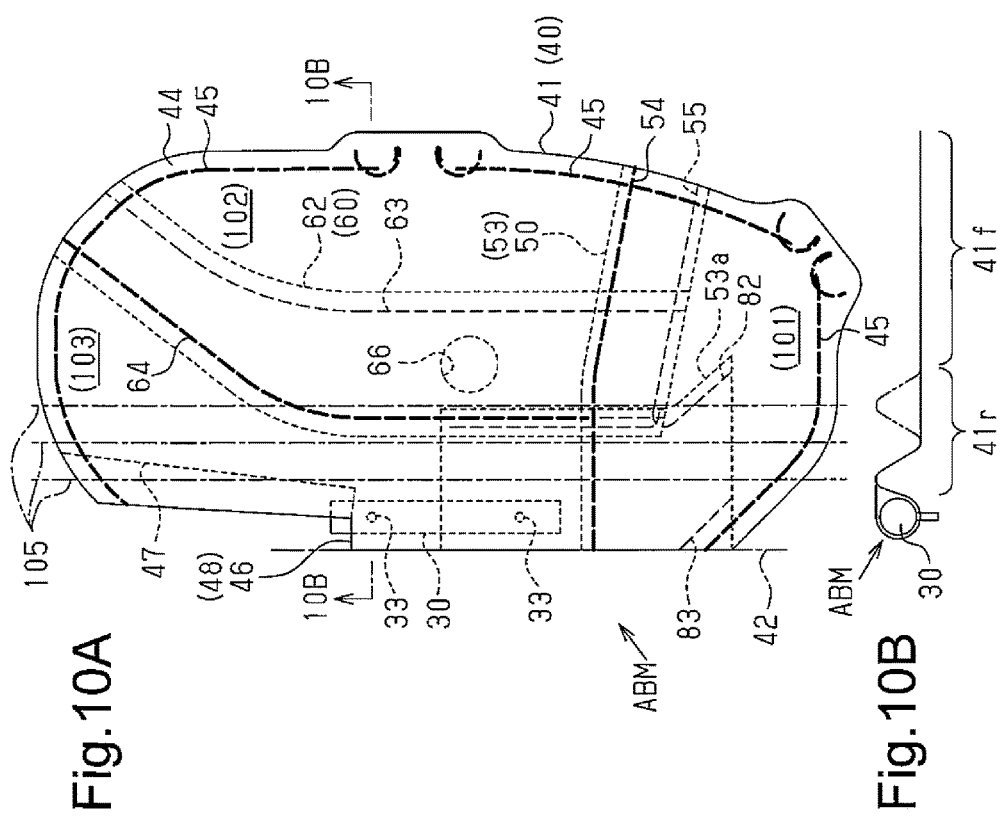

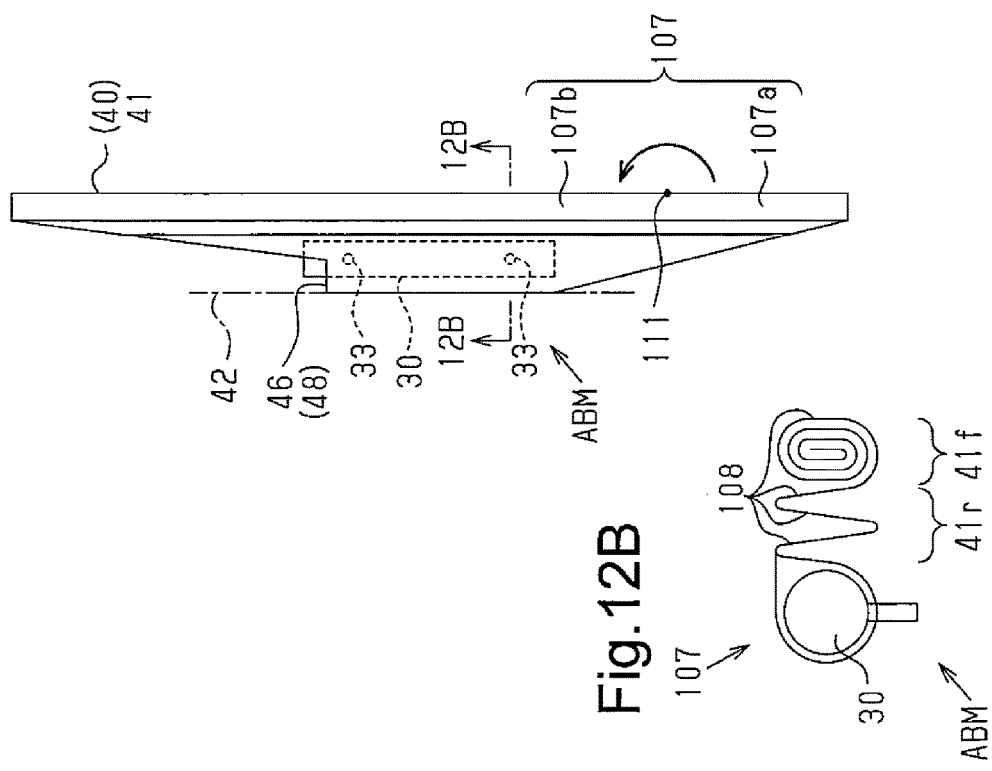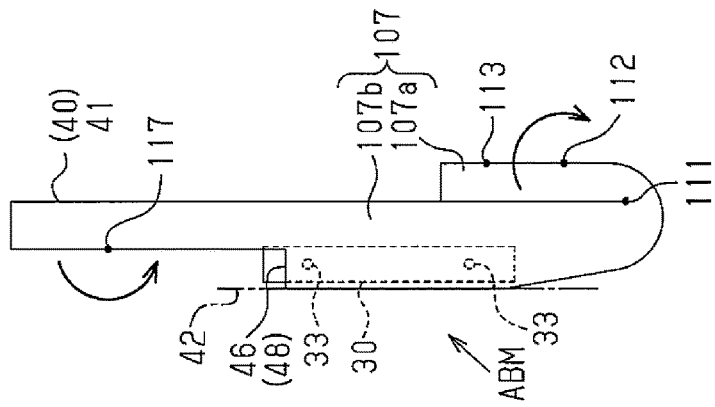

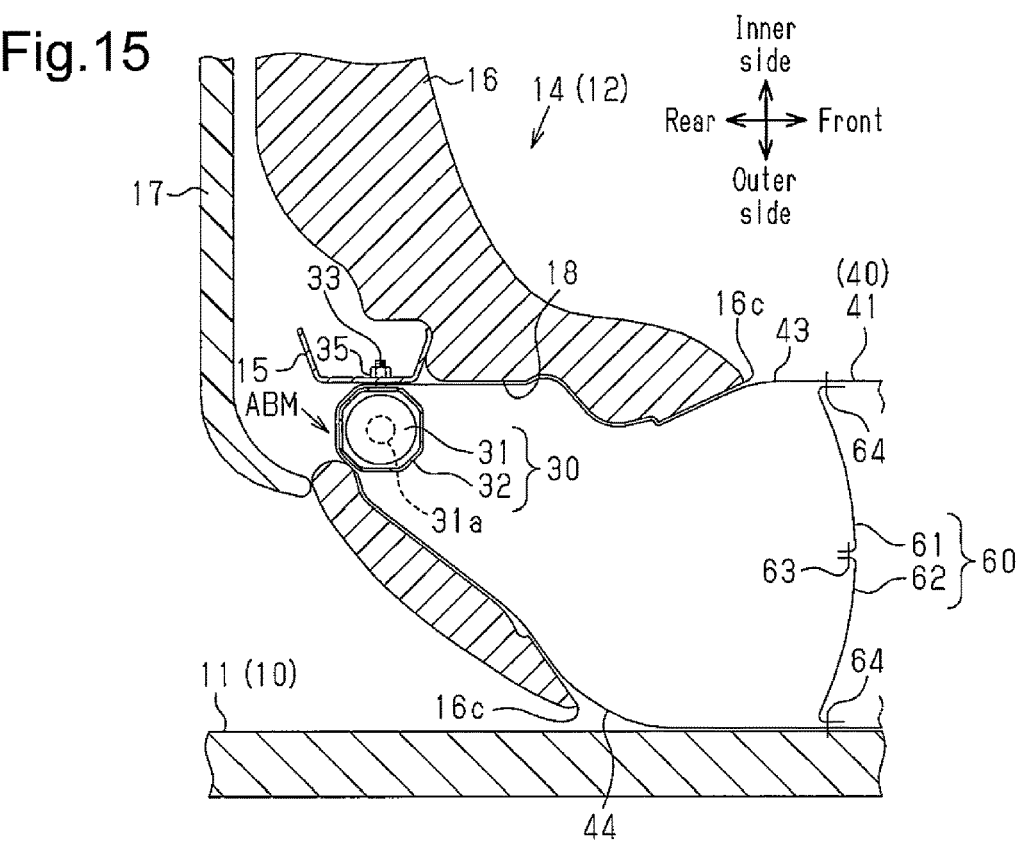
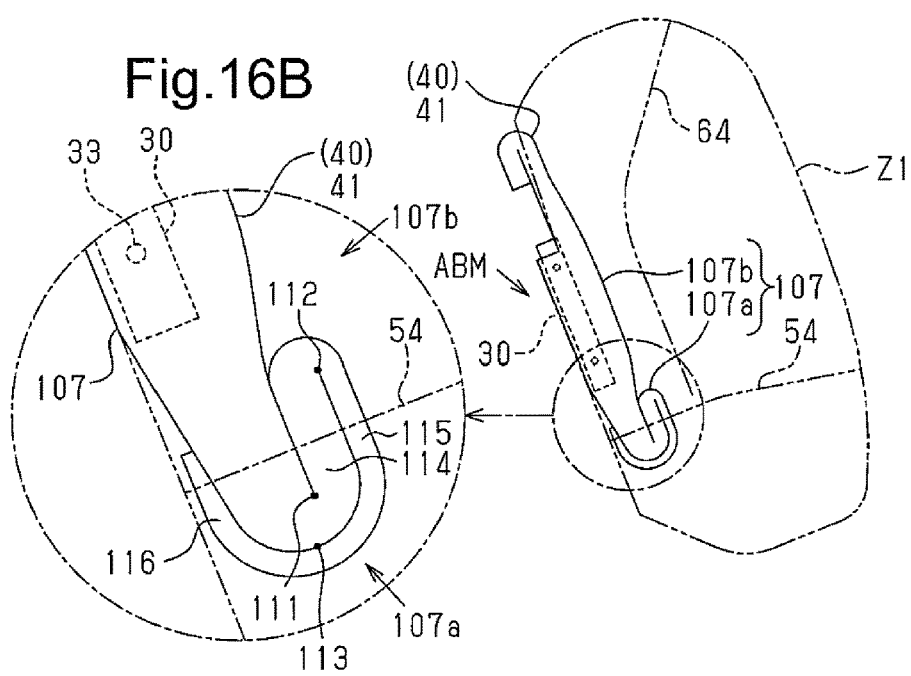

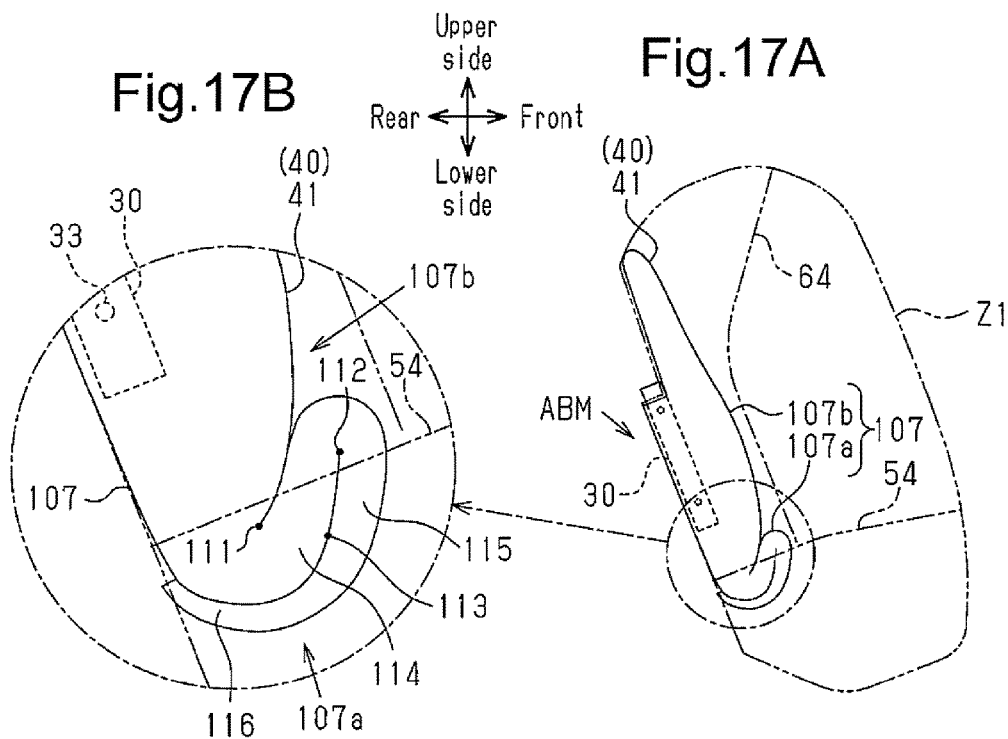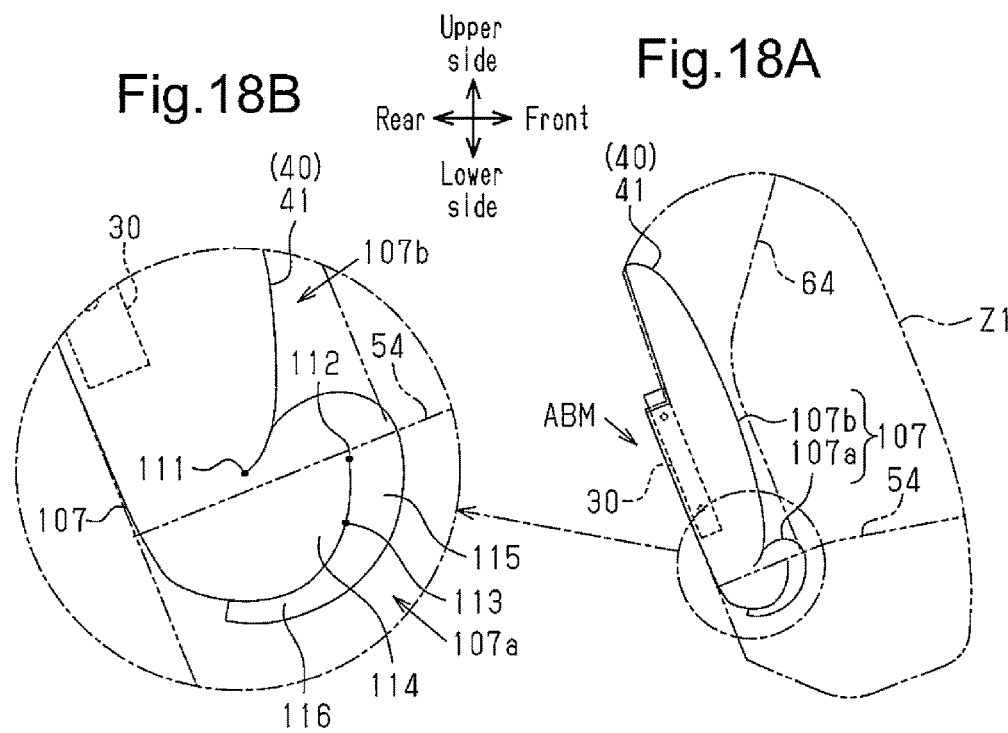

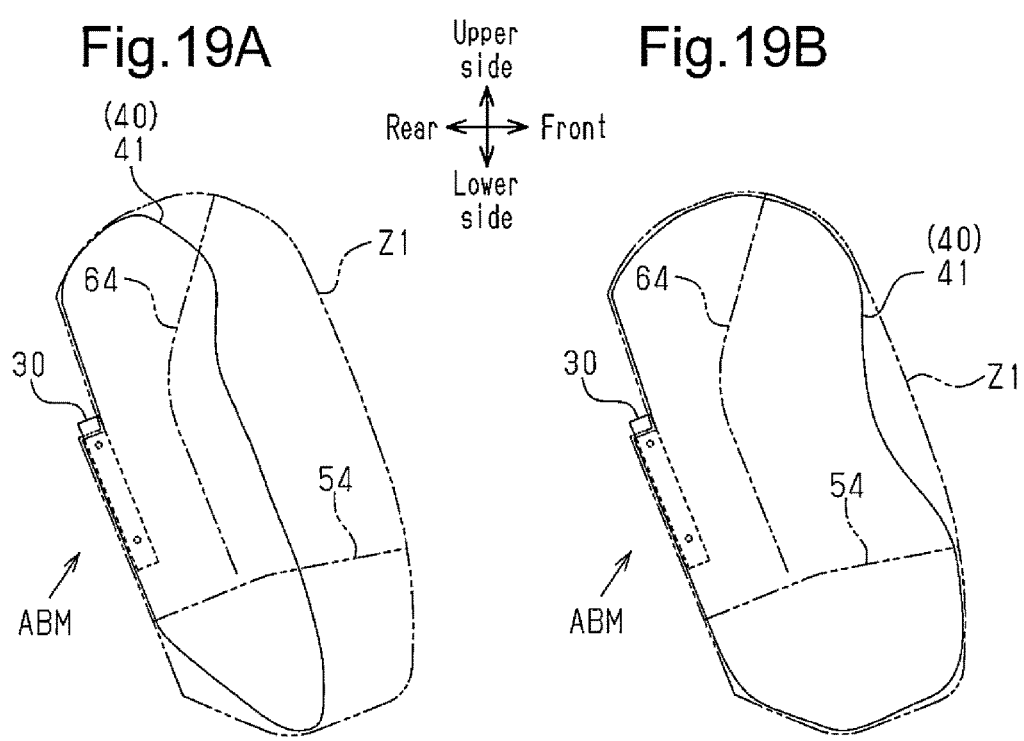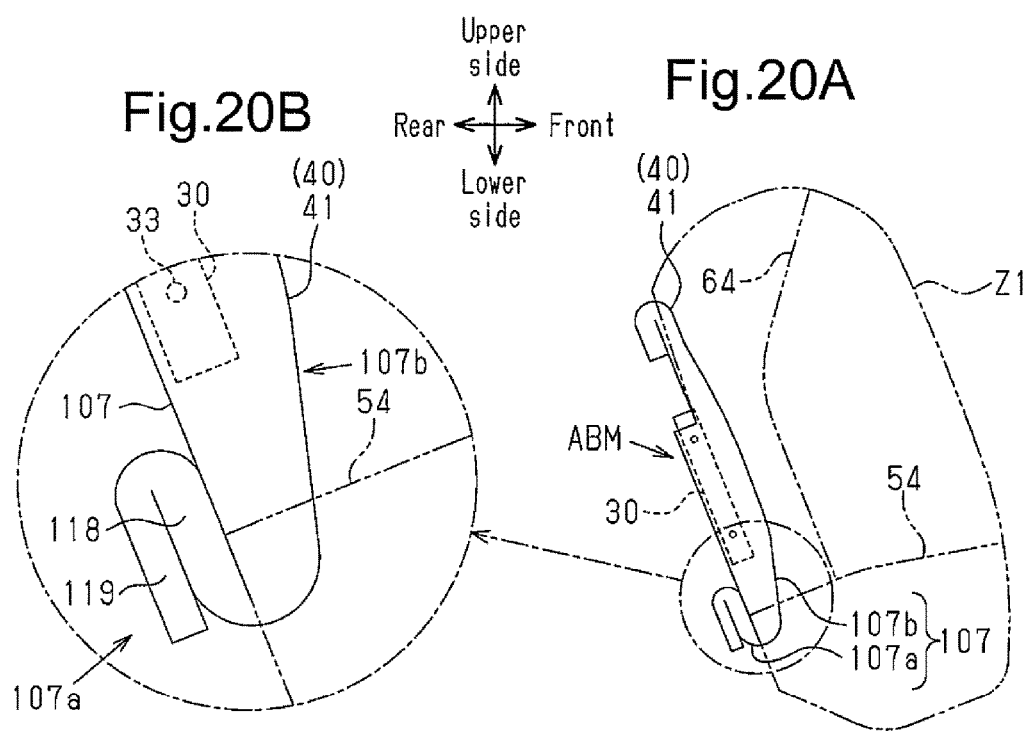

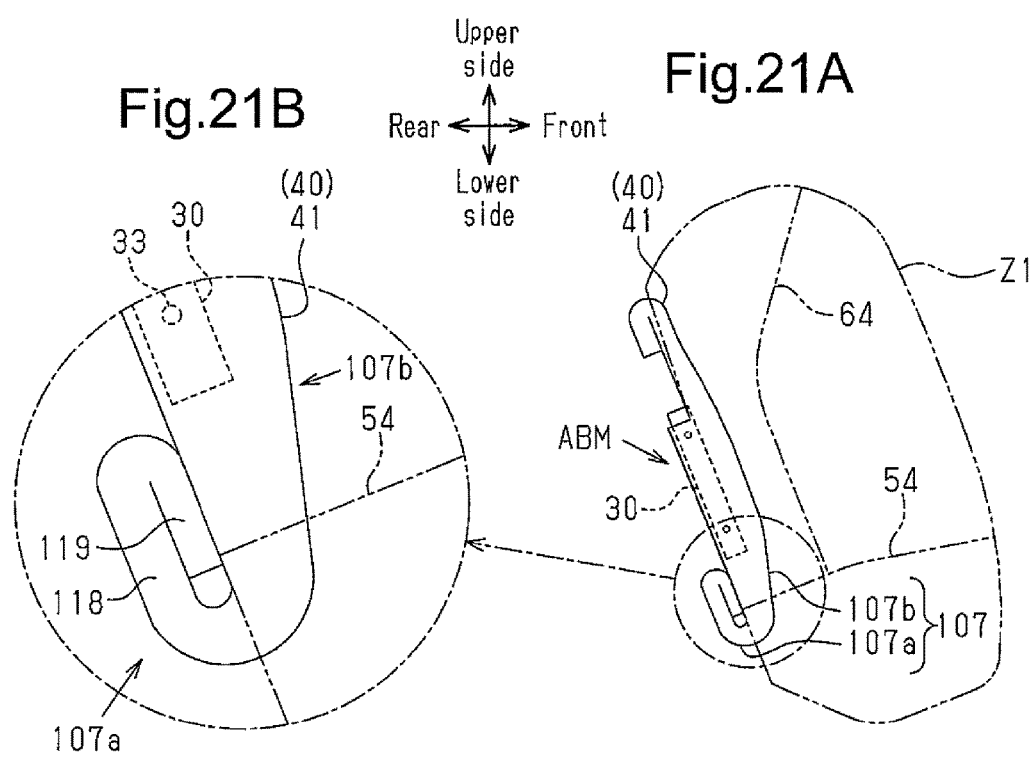

SIDE AIRBAG APPARATUS

BACKGROUND OF THE INVENTION

The present invention relates to a side airbag apparatus that protects an occupant seated in a vehicle seat by deploying and inflating an airbag on a side of the occupant when an impact is applied to the vehicle from the side of the vehicle seat.

A side airbag apparatus is widely known as an apparatus that protects an occupant seated in an automobile seat when an impact is applied to the seat from a side, for example, due to a side collision. Such a side airbag apparatus includes an airbag main body forming the outer shape of the airbag and a gas generator arranged in the airbag main body. The airbag main body is folded into a storage form and stored in the seat back of an automobile seat together with the gas generator.

In the side airbag apparatus, when an impact is applied from the side to a member forming the side portion of the automobile (body side portion) such as a side door, inflation gas is supplied from the gas generator into the airbag main body so that the airbag main body is deployed and inflated. The airbag main body is projected from the automobile seat with a part remaining in the seat back. Thereafter, the airbag main body is deployed and inflated in a predetermined deployment region between the occupant and the body side portion. The airbag main body restrains the occupant and mitigates the impact that is transmitted from the side to the occupant through the body side portion.

One form of such a side airbag apparatus is disclosed, for example, in Japanese Laid-Open Patent Publication No. 2008-87632. In this side airbag apparatus, the airbag main body is spread into a flat state without being supplied with inflation gas, that is, an uninflated-spread state, to be turned into a storage form. The airbag main body in this state is folded from the front end toward the rear end, so that the airbag main body has a stacked portion, which has a vertically elongated shape. The stacked portion includes a plurality of structural segments each extending vertically. The structural segments stacked onto each other in the thickness direction.

The stacked portion includes a first stacked section, which forms a lower part, and a second stacked section, which forms a part above the first stacked section and accommodates the gas generator. The first stacked section is folded back rearward to be arranged behind the second stacked section.

Thus, the airbag main body in the storage form is deployed and inflated in a manner different from the manner in which the first stacked section is arranged in front of the second stacked section.

That is, in the side airbag apparatus, in which the first stacked section is arranged in front of the second stacked section, inflation gas flows to the second stacked section and the first stacked section in that order. The first stacked section is pivoted forward about the boundary between the first stacked section and the second stacked section. At this time, the second stacked section being inflated pushes the first stacked section forward, thereby accelerating the forward pivoting motion of the first stacked section. With the pivoting motion of the first stacked section, the structural segments in the first stacked section are deployed and inflated forward with momentum to project forward beyond the predetermined deployment region. If an obstacle exists in the path of the deployment of the airbag main body, the lower part of the airbag main body may thrust upon the obstacle.

In contrast, in the side airbag apparatus disclosed in Japanese Laid-Open Patent Publication No. 2008-87632, the first stacked section is pivoted behind or below the second stacked section about the boundary between the first stacked section and the second stacked section. Even though the second stacked section is inflated, the first stacked section, which is located behind the second stacked portion, is not pushed forward. With the pivoting motion of the first stacked section, the structural segments in the first stacked section are first deployed and inflated behind or below the second stacked section. Subsequently, the structural segments in the first stacked section are deployed and inflated in front of the second stacked section. The structural segments in the first stacked section are prevented from being deployed and inflated forward with momentum and projecting forward beyond the deployment region. Thus, even if there is an obstacle in the deployment path of the airbag main body, the lower part of the airbag main body is restricted from thrusting upon the obstacle.

However, in the side airbag apparatus disclosed in Japanese Laid-Open Patent Publication No. 2008-87632, if an airbag main body with a great vertical dimension is used, the first stacked section in the stacked portion in the storage form is elongated. Thus, the long first stacked section is pivoted about the boundary between the first stacked section and the second stacked section. Accordingly, the structural segments in the first stacked section are deployed and inflated. Thus, during the process of forward deployment and inflation, the structural segments in the first stacked section can project forward beyond the deployment region. The effect of restricting the lower part of the airbag main body from thrusting upon the obstacle is thus unsatisfactory.

Particularly, the side airbag apparatus disclosed in Japanese Laid-Open Patent Publication No. 2008-87632 is configured such that the airbag main body is divided into at least an upper inflation chamber and a lower inflation chamber, and inflation gas is preferentially supplied to the lower inflation chamber. Regarding the stacked portion of the airbag main body, inflation gas is preferentially supplied to the first stacked section, which constitutes the lower part of the stacked portion. Thus, the structural segments in the first stacked section are likely to be deployed and inflated forward with momentum and project forward beyond the deployment region. Therefore, restriction of such forward projection of the structural segments in the first stacked section is effective in mitigating the impact applied to the obstacle.

The above described drawbacks are not limited to automobiles, but may be found in any type of vehicles equipped with a side airbag apparatus.

SUMMARY OF THE INVENTION

Accordingly, it is an objective of the present invention to provide a side airbag apparatus that restrains the lower part of an airbag main body from projecting forward beyond a deployment region when being deployed and inflated.

To achieve the foregoing objective and in accordance with one aspect of the present invention, a side airbag apparatus is provided that includes a gas generator, an airbag main body, a lateral partition, and an inner tube. The gas generator discharges inflation gas in response to an impact applied to a vehicle seat from a side. The airbag main body is stored in a storage portion provided beside an occupant seated in the vehicle seat and is configured to be deployed and inflated by the inflation gas in a deployment region beside the occupant. The airbag main body is stored in the storage portion in a storage form. The lateral partition is arranged in the airbag main body and divides at least a part of an interior of the airbag main body into an upper inflation chamber and a lower inflation chamber, which is located below the upper inflation chamber. The inner tube is arranged in the airbag main body and guides the inflation gas from the gas generator to the upper inflation chamber and the lower inflation chamber such that the inflation gas is preferentially supplied to the lower inflation chamber over the upper inflation chamber. The airbag main body includes an elongated stacked portion. The stacked portion is formed by vertically extending structural segments, which are stacked in a thickness direction of the structural segments. The stacked portion includes a first stacked section, which forms a lower part, and a second stacked section, which forms a part above the first stacked section and accommodates the gas generator. In the storage form, the first stacked section includes a plurality of bent sections arranged along a flowing direction of inflation gas. Among the bent sections, the bent section that is located at the most downstream position in the inflation gas flowing direction is a downstream bent section. Among the bent sections, at least the downstream bent section is arranged behind the second stacked section.

BRIEF DESCRIPTION OF THE DRAWINGS

FIG. 10A is a side view of the airbag module with folding lines, illustrating a state before the airbag main body is folded according to the embodiment.

FIG. 10B is a cross-sectional view taken along line 10B-10B of FIG. 10A.

FIG. 11A is a side view of the airbag module with folding lines, illustrating a state in which the airbag main body is being folded according to the embodiment.

FIG. 11B is a cross-sectional view taken along line 11B-11B of FIG. 11A.

FIG. 12A is a side view of the airbag module, illustrating a state in which the airbag main body is being folded according to the embodiment.

FIG. 12B is a cross-sectional view taken along line 12B-12B of FIG. 12A.

FIG. 13 is a side view of the airbag module, illustrating a state in which the airbag main body is being folded according to the embodiment.

FIG. 14 is a side view of the airbag module, illustrating a state in which the airbag main body has been folded into a storage form.

FIG. 15 is a partial cross-sectional plan view illustrating a state in which the airbag main body of FIG. 3 has been projected from the automobile seat to be deployed and inflated with a part remaining in the seat back.

FIG. 16A is a side view of the airbag module and a deployment region, illustrating a state before the airbag main body is deployed and inflated according to the embodiment.

FIG. 16B is an enlarged partial side view illustrating a part of FIG. 16A.

FIG. 17A is a side view of the airbag module and a deployment region, illustrating a state in which the airbag main body is being deployed and inflated according to the embodiment.

FIG. 17B is an enlarged partial side view illustrating a part of FIG. 17A.

FIG. 18A is a side view of the airbag module and a deployment region, illustrating a state in which the airbag main body is being deployed and inflated according to the embodiment.

FIG. 18B is an enlarged partial side view illustrating a part of FIG. 18A.

FIGS. 19A and 19B are side views of the airbag module and a deployment region, illustrating a state in which the airbag main body is being deployed and inflated according to the embodiment.

FIG. 20A is a side view of the airbag module and a deployment region, illustrating a state before the airbag main body is deployed and inflated in a modification.

FIG. 20B is an enlarged partial side view illustrating a part of FIG. 20A.

FIG. 21A is a side view of the airbag module and a deployment region, illustrating a state before the airbag main body is deployed and inflated in another modification.

FIG. 21B is an enlarged partial side view illustrating a part of FIG. 21A.

DETAILED DESCRIPTION OF THE PREFERRED EMBODIMENTS

Figure 1:
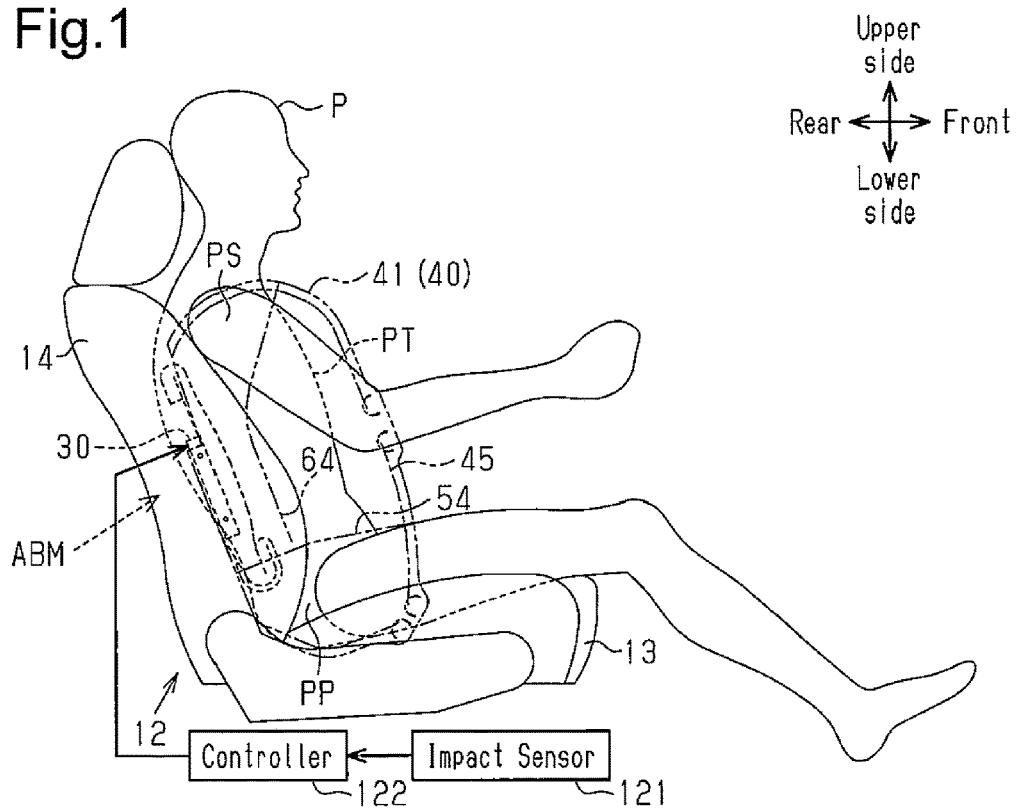
FIG. 1 is a side view of an automobile side airbag apparatus according to one embodiment, illustrating, together with an occupant, the apparatus installed in an automobile seat.

An automobile side airbag apparatus according to one embodiment of the present invention will now be described with reference to FIGS. 1 to 19B.

In the following description, the direction in which the automobile advances forward will be referred to as the front, and the reverse direction will be referred to as the rear. The center of the width direction of the automobile (the automobile width direction) is used as a reference. A side closer to the center in the automobile width direction will be referred to as "inner side" of the automobile, while a side farther from the center in the automobile width direction will be referred to "outer side" of the automobile. In the drawings, the direction toward the center of the automobile is indicated by "inner side," while the direction toward the exterior of the automobile is indicated by "outer side." It is now assumed that an occupant having a size equivalent to a crash test dummy is seated in the automobile seat. The crash test dummy is, for example, the AM50 (the model that covers 50% of the American adult male population) of the WorldSID program.

Figure 2:
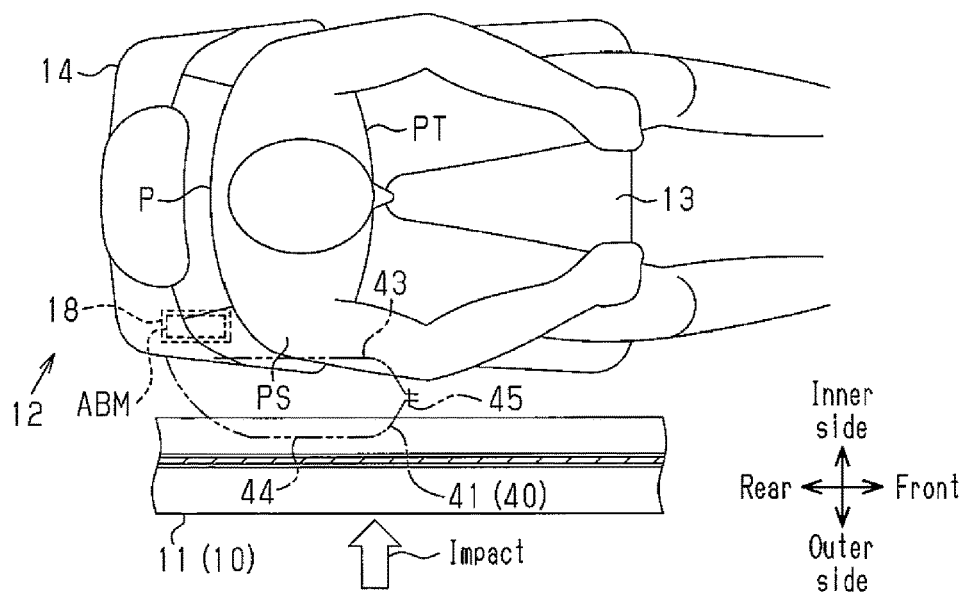
FIG. 2 is a cross-sectional plan view of the positional relationship of the automobile seat, an airbag, the occupant, and a body side portion according to the embodiment.

As shown in FIGS. 1 and 2, an automobile 10, which is a vehicle, has an automobile seat 12, which is a vehicle seat, arranged on the inner side of a body side portion 11. The body side portion 11 refers to an automobile component that is located on a side of the automobile 10, and mainly corresponds to doors and pillars. For example, the part of the body side portion 11 corresponding to the front seat includes a front door and a center pillar (B-pillar). The part of the body side portion 11 corresponding to the rear seat includes a rear part of the side door (rear door), a C-pillar, a front part of a wheel well, and the rear quarter.

The automobile seat 12 includes a seat cushion 13 and a seat back 14, which extends upward from the rear end of the seat cushion 13. The tilt angle of the seat back 14 is adjustable. The automobile seat 12 is arranged in the passenger compartment such that the seat back 14 faces forward. The width direction of the automobile seat 12 thus agrees with the automobile width direction.

The internal structure of a side portion of the seat back 14 on the outer side will now be described.

Figure 3:
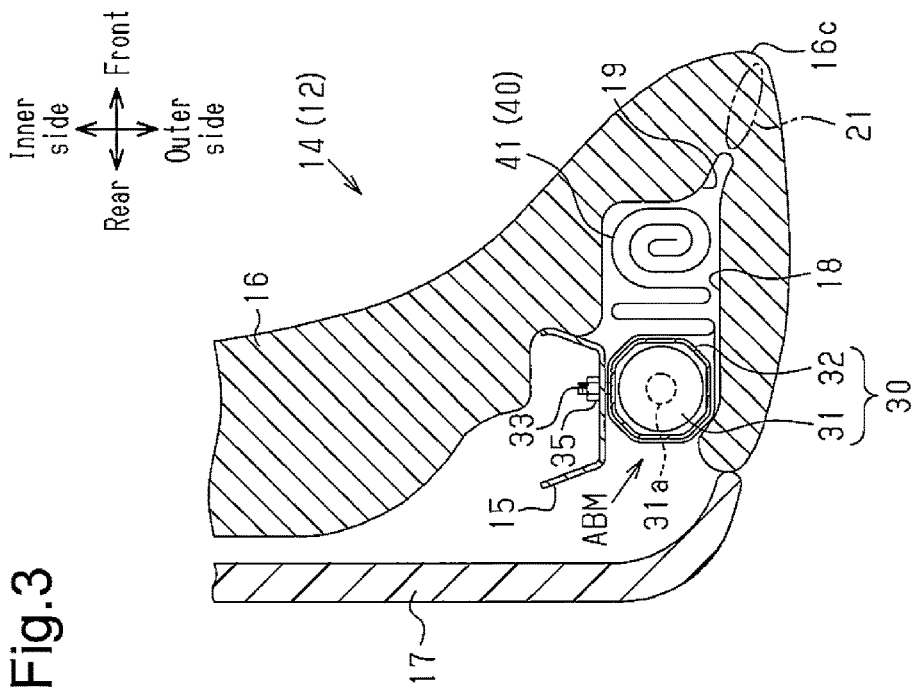
FIG. 3 is a cross-sectional plan view partially showing the internal structure of a side portion of the seat back in which an airbag module is installed in the embodiment.

The seat back 14 incorporates a seat frame, which forms the framework. A part of the seat frame forms a side frame portion 15, which is located in the outer-side portion of the seat back 14 as shown in FIG. 3. The side frame portion 15 is formed by bending a metal plate. A seat pad 16, which is made of an elastic material such as urethane foam, is provided in front of the seat frame, which includes the side frame portion 15. Also, a hard back board 17, which is formed, for example, of plastic, is arranged on the back of the seat frame. Although the seat pad 16 is coated with a cover, the cover is not illustrated in FIG. 3. The same applies to FIG. 15, which will be discussed below.

In the seat pad 16, a storage portion 18 is provided in the vicinity of the outer side of the side frame portion 15. The storage portion 18 stores an airbag module ABM, which forms a main part of the side airbag apparatus.

A slit 19 is formed to extend from a corner of the storage portion 18. The slit 19 extends diagonally forward and toward the outer side. The section between a front corner 16c of the seat pad 16 and the slit 19 (the location surrounded by the long dashed double-short dashed line in FIG. 3) forms a breakable portion 21, which is designed to be broken by an airbag main body 41, which will be discussed below.

The airbag module ABM includes as its main components a gas generator 30 and the airbag 40. The outer shape of the airbag 40 is formed by an airbag main body 41. These components will now be described.

<Gas Generator 30>

Figure 4:
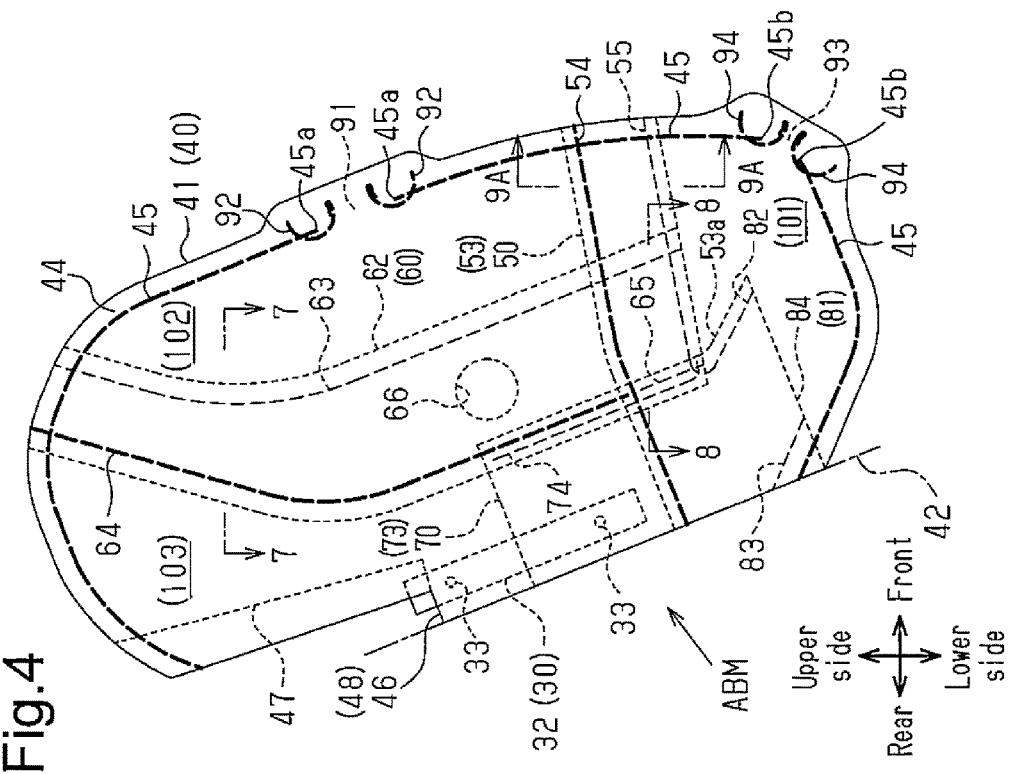
FIG. 4 is a side view of the airbag module, in which the airbag main body is in an uninflated-and-spread state according to the embodiment.

As shown in FIGS. 3 and 4, the gas generator 30 includes an inflator 31 and a retainer 32, which surrounds the inflator 31. A pyrotechnic type inflator is employed as the inflator 31. The inflator 31 is substantially columnar and accommodates a gas generating agent (not shown), which generates inflation gas. The inflator 31 has a gas outlet 31a at the lower end. The gas outlet 31a has a diameter smaller than the remainder of the inflator 31. A harness (not shown) for delivering activating signals to the inflator 31 is connected to the upper end of the inflator 31.

In place of the pyrotechnic type inflator using the gas generating agent, it is possible to use a hybrid type inflator, which discharges inflation gas by breaking a partition wall of a high-pressure gas cylinder filled with high-pressure gas with a low explosive.

The retainer 32 functions as a diffuser for controlling the direction of discharged inflation gas and also serves as a member for fastening the inflator 31, together with the airbag main body 41, to the side frame portion 15. Most of the retainer 32 is formed by bending a plate such as a metal plate into a cylindrical shape.

A pair of bolts 33 is fixed to the retainer 32. The bolts 33 serve as securing members for attaching the retainer 32 to the side frame portion 15. The gas generator 30 may be configured by integrating the inflator 31 and the retainer 32.

<Airbag Main Body 41>

Figure 5:
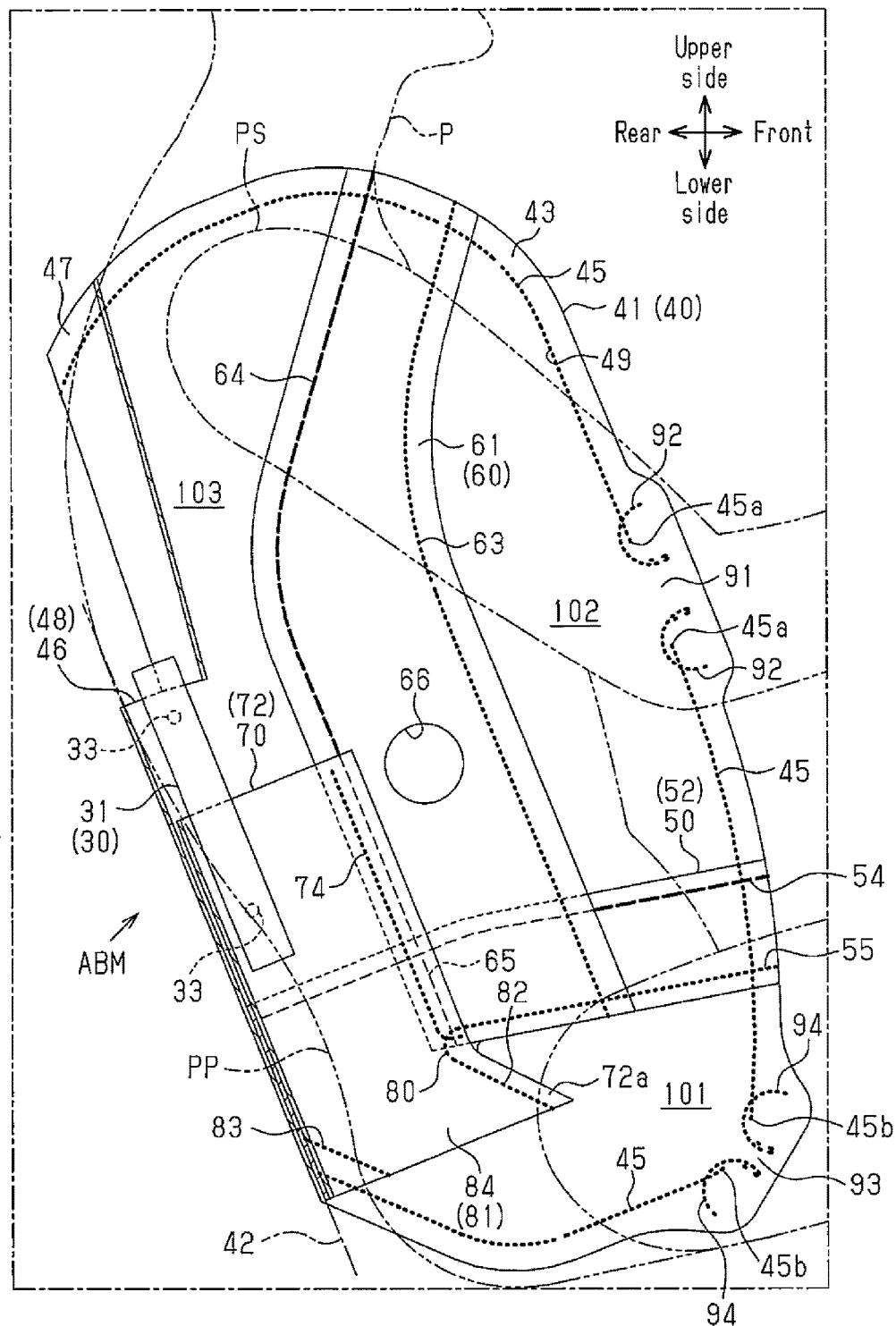
FIG. 5 is a cross-sectional side view showing the internal structure of the airbag module shown in FIG. 4, together with an occupant.
Figure 6:
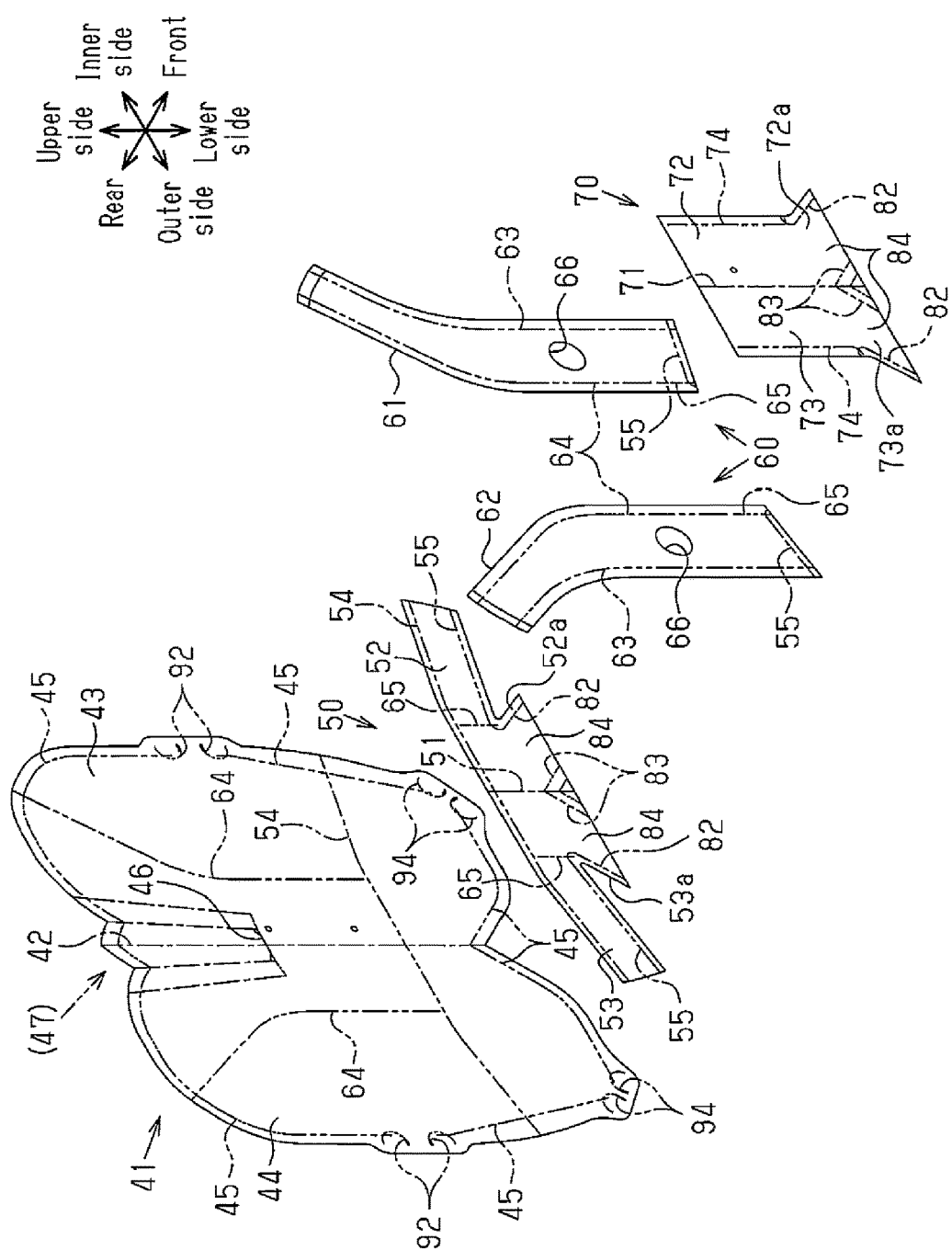
FIG. 6 is an exploded perspective view showing a spread state of the components of the airbag in the embodiment.

FIG. 4 shows the airbag module ABM in a state in which the airbag main body 41 is spread into a planar state without being filled with inflation gas (hereinafter, referred to as an uninflated-and-spread state). FIG. 5 shows, together with the occupant P, the airbag module ABM in which the airbag main body 41 of FIG. 4 is cut at the center portion in the automobile width direction to show the internal structure of the airbag module ABM. FIG. 6 shows the components of the airbag 40 including the airbag main body 41 in a deployed state.

As shown in FIGS. 4 to 6, the airbag main body 41 is formed by folding a single fabric piece (also referred to as a base fabric or a fabric panel) along a folding line 42 to be stacked in the automobile width direction, and joining the stacked parts. To distinguish the two stacked parts of the airbag main body 41, the part located on the inner side will be referred to as a main body fabric portion 43, and the part located on the outer side will be referred to as a main body fabric portion 44.

The shape and the size of the main body fabric portions 43, 44 are set such that the airbag main body 41 occupies the region corresponding to most part of the upper body of the occupant P (the region including the lumbar region PP and the shoulder region PS) when the airbag main body 41 is deployed and inflated between the automobile seat 12 and the body side portion 11. The region will be referred to as a deployment region Z1 of the airbag main body 41 (refer to FIG. 16A).

In the present embodiment, the fabric piece is folded in half such that the folding line 42 is located at the rear end of the airbag main body 41. However, the fabric piece may be folded in half such that the folding line 42 is located at another end of the airbag main body 41, such as the front end, the upper end, or the lower end. The airbag main body 41 may also be formed of two fabric pieces divided along the folding line 42. Furthermore, the airbag main body 41 may be formed of three or more fabric pieces.

The main body fabric portions 43, 44 are preferably formed of a material having high strength and flexibility to be easily folded. The material may be, for example, woven cloth formed of polyester threads or polyamide threads.

The main body fabric portions 43, 44 are joined to each other at a peripheral joint portion 45 provided along the peripheries. In the present embodiment, the peripheral joint portion 45 is formed by sewing, with sewing threads, parts of the peripheral portions of the main body fabric portions 43, 44 except for the rear end (the part in the vicinity of the folding line 42). This configuration applies to various types of joint portions, which will be discussed below. Other joint portions include a first lateral joint portion 54, second lateral joint portions 55, first vertical joint portions 63, 74, second vertical joint portions 64, third vertical joint portions 65, first inclined joint portions 82, second inclined joint portions 83, and first and second surrounding joint portions 92, 94.

In FIGS. 4, 5, 10A, and 11A, sewn portions are indicated by first to third broken lines. The first broken line includes thick line segments of a certain length arranged intermittently and represents sewing threads as viewed from the side (refer to the peripheral joint portion 45 in FIG. 4). The second broken line includes thin line segments of a certain length (longer than that in a typical broken line) arranged intermittently and represents the state of sewing threads that are located, for example, behind a fabric piece and cannot be seen directly (refer to the first vertical joint portion 63 in FIG. 4). The third broken line includes dots arranged at predetermined intervals and represents the cross-section of the sewing threads extending along a plane that passes through the sewn portions (refer to the peripheral joint portion 45 in FIG. 5).

The peripheral joint portion 45 may be formed by a method other than sewing using sewing threads. For example, the peripheral joint portion 45 may be formed by adhesion with an adhesive. Such modification is applicable to any of the above described joint portions.

As shown in FIGS. 4 to 6, a slit 46 extending in a direction perpendicular to the folding line 42 is formed at the rear end of the airbag main body 41 and at the middle part in the vertical direction. A part of the main body fabric portions 43, 44 above the slit 46 forms an inward folding portion 47, which is folded into, or tucked into, the remaining parts of the airbag main body 41. The upper end of the inward folding portion 47 is joined to the remaining parts of the main body fabric portions 43, 44 by a part of the peripheral joint portion 45. When the inward folding portion 47 is formed, the slit 46 is opened to form an insertion port 48 for the gas generator 30.

The space between the main body fabric portions 43, 44 and surrounded by the peripheral joint portion 45 serves as an inflation portion 49. When being deployed and inflated by inflation gas beside a great proportion of the upper body of the occupant P (the part from the lumbar region PP to the shoulder region PS), the inflation portion 49 restrains that part and protects it from the impact.

A lateral partition 50, a vertical partition 60, and an inner tube 70 are provided in the inflation portion 49. Among these members, the lateral partition 50 and the vertical partition 60 each have the same structure as a member generally referred to as a tether.

<Lateral Partition 50>

As shown in FIGS. 5, 6, 8, and 9A, the lateral partition 50 is formed by folding a laterally elongated single fabric piece, which is made of the same material as the airbag main body 41, along a vertical folding line 51 to be stacked in the automobile width direction, and installing the stacked portions to bridge the lower parts of the main body fabric portions 43, 44. The lateral partition 50 may also be formed of two fabric pieces divided along the folding line 51. To distinguish the two stacked portions of the lateral partition 50, the part located on the inner side will be referred to as a fabric portion 52, and the part located on the outer side will be referred to as a fabric portion 53.

As shown in FIGS. 4 and 6, the fabric portions 52, 53 of the lateral partition 50 folded in half have, at the rear ends, extensions 52a, 53a extending substantially downward, respectively. The lateral partition 50 is located between the main body fabric portions 43 and 44 with the folding line 51 agreed with the folding line 42 of the airbag main body 41. The fabric portions 52, 53 of the lateral partition 50 are each joined to the adjacent one of the main body fabric portions 43, 44 by the first lateral joint portion 54, which extends substantially in the front-rear direction along the upper edges of the fabric portions 52, 53. That is, the fabric portion 52 is joined to the main body fabric portion 43, and the fabric portion 53 is joined to the main body fabric portion 44.

The fabric portions 52, 53 of the lateral partition 50, which is folded in half, are joined to each other by the second lateral joint portions 55, which are formed to extend substantially in the front-rear direction along the lower edges of the fabric portions 52, 53. Further, the front ends of the fabric portions 52, 53 are joined to the front lower ends of the main body fabric portions 43, 44 by a part of the peripheral joint portion 45.

A space of the inflation portion 49 below the lateral partition 50 forms a lower inflation chamber 101, which is deployed and inflated beside the lumbar region PP, which is a part of the upper body of the occupant P (see FIG. 5). The space above the lateral partition 50 forms an upper inflation chamber.

<Vertical Partition 60>

As shown in FIGS. 4, 6, 7, and 8, the vertical partition 60 includes a pair of fabric pieces 61, 62, which is made of the same material as the airbag main body 41. When the airbag main body 41 is in the uninflated-and-spread state, the fabric pieces 61, 62 are stacked onto each other in the automobile width direction. At this time, the upper parts of the fabric pieces 61, 62 are inclined forward. The upper ends of the fabric pieces 61, 62 are joined to the front upper parts of the main body fabric portions 43, 44 by a part of the peripheral joint portion 45.

The lower parts of the fabric pieces 61, 62 of the vertical partition 60 are stacked onto the fabric portions 52, 53 of the lateral partition 50. The lower ends of the fabric pieces 61, 62 of the vertical partition 60 are joined to the fabric portions 52, 53 of the lateral partition 50 by the second lateral joint portions 55.

The fabric pieces 61, 62 are joined to each other by the first vertical joint portion 63, which substantially vertically extends along the front edges of the fabric pieces 61, 62.

Figure 7:
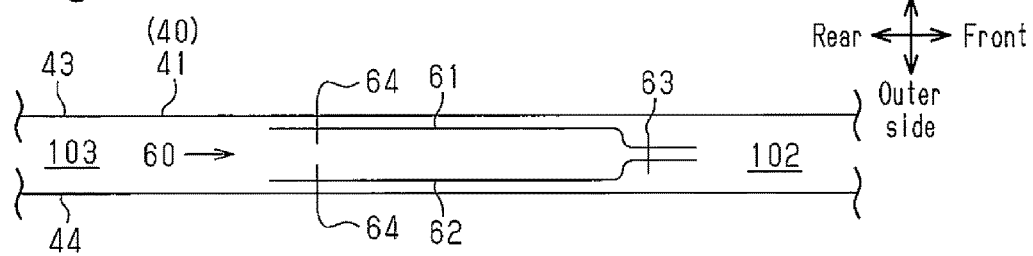
FIG. 7 is a cross-sectional view taken along line 7-7 of FIG. 4.
Figure 8:
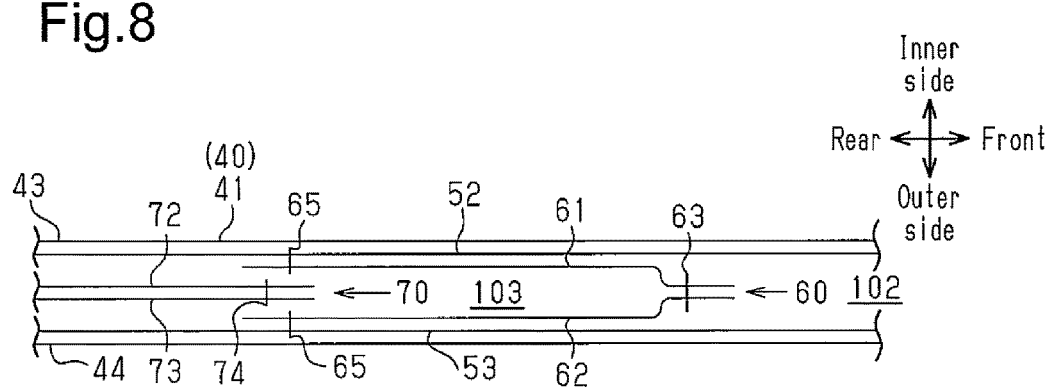
FIG. 8 is a cross-sectional view taken along line 8-8 of FIG. 4.
Figure 9A:
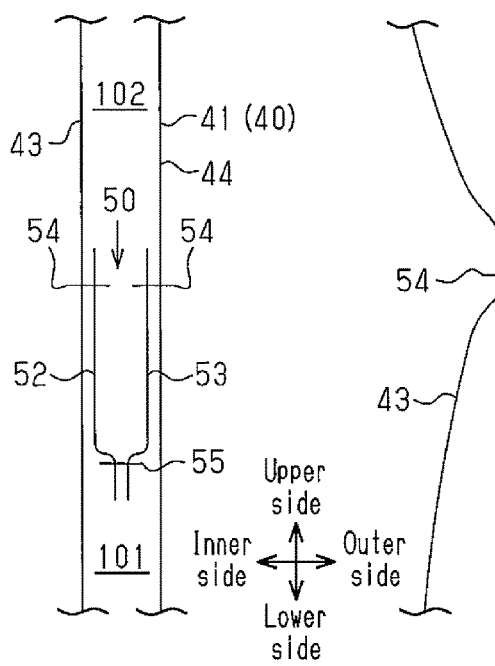
FIG. 9A is a cross-sectional view taken along line 9A-9A in FIG. 4.
Figure 9B:
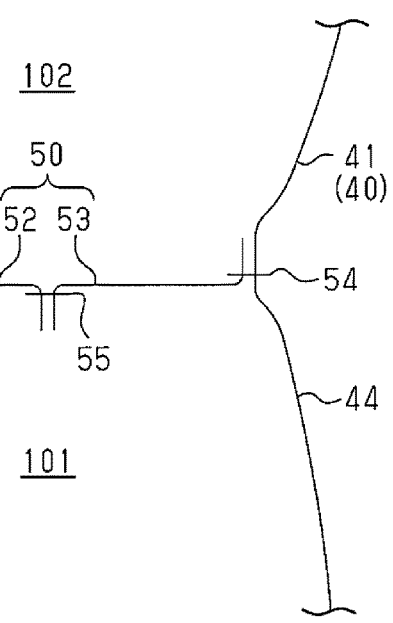
FIG. 9B is a partial cross-sectional view showing a state of the interior of the airbag lower part when the lateral partition is strained from the state shown in FIG. 9A.

Parts of the fabric pieces 61, 62 that are not overlapped with the lateral partition 50 are each joined to the adjacent one of the main body fabric portions 43, 44 of the airbag main body 41 by the second vertical joint portions 64, which are provided to substantially vertically extend at the rear edges of the fabric pieces 61, 62 (see FIG. 7). That is, the fabric piece 61 is joined to the main body fabric portion 43, and the fabric piece 62 is joined to the main body fabric portion 44. Also, parts of the fabric pieces 61, 62 that are overlapped with the lateral partition 50 are each joined only to the adjacent one of the main body fabric portions 52, 53 of the lateral partition 50 by the third vertical joint portions 65, which are provided to substantially vertically extend at the rear edges of the fabric pieces 61, 62 (see FIG. 8). That is, the fabric piece 61 is joined to the fabric portion 52, and the fabric piece 62 is joined to the fabric portion 53.

A part of the upper inflation chamber that is behind the vertical partition 60 forms an upper-rear inflation chamber 103. The gas generator 30 is arranged at the rear end in the upper-rear inflation chamber 103, which will be discussed in detail below. The upper-rear inflation chamber 103 is supplied with inflation gas from the gas generator 30 to be deployed and inflated beside the rear half of the thorax region PT and the shoulder region PS in the upper body of the occupant P (see FIG. 5).

A space of the upper inflation chamber that is in front of the vertical partition 60 forms an upper-front inflation chamber 102. The upper-front inflation chamber 102 is supplied with inflation gas delivered via the upper-rear inflation chamber 103 and the vertical partition 60 and is deployed and inflated beside the front half of the thorax region PT in the upper body of the occupant P (see FIG. 5).

The vertical partition 60 has the communication portions 66, which connect the upper-rear inflation chamber 103 and the upper-front inflation chamber 102 with each other. In the present embodiment, the communication portions 66 are configured by holes formed in the fabric pieces 61, 62 of the vertical partition 60 (see FIG. 6).

Each of the fabric pieces 61, 62 may have two or more communication portions 66. Only one of the fabric pieces 61, 62 may have a communication portion 66.

<Inner Tube 70>

The inner tube 70 is arranged at the rear part in the airbag main body 41 in the uninflated-spread state and below the insertion port 48. The inner tube 70 is formed by a single fabric piece that is made of the same material as the airbag main body 41. The surface of the fabric piece may be coated with silicone resin.

The inner tube 70 is formed by folding the single fabric piece in half along a folding line 71 set at the center portion to be stacked onto itself in the automobile width direction, and joining the stacked portions to form a tubular shape. The inner tube 70 may be formed of two fabric pieces divided along the folding line 71. To distinguish the two stacked portions of the inner tube 70, the part located on the inner side will be referred to as a fabric portion 72, and the part located on the outer side will be referred to as a fabric portion 73.

The fabric portions 72, 73 in the inner tube 70, which is folded in half, respectively have, in the lower parts, extensions 72a, 73a, which extend substantially downward. The extensions 72a, 73a substantially have the same shapes as the extensions 52a, 53a of the lateral partition 50, which are described above.

The inner tube 70, which is folded in half as described above, is arranged between the fabric portions 52, 53 of the lateral partition 50 and between the main body fabric portions 43, 44 of the airbag main body 41, with the folding line 71 agreed with the folding line 42 of the airbag main body 41 and the folding line 51 of the lateral partition 50. The inner tube 70 is joined to the airbag main body 41 and the lateral partition 50 by a joint portion (not shown) formed along the folding line 71. The fabric portions 72, 73 in the inner tube 70 are joined to each other by the first vertical joint portions 74, which extend vertically along the front edges.

Most of the gas generator 30 is arranged to extend substantially vertically and is accommodated in the rear end of the airbag main body 41. The lower half of the gas generator 30 is accommodated in the rear end of the upper part of the inner tube 70. The upper part of the gas generator 30 extends through the insertion port 48 to be exposed to the outside of the airbag main body 41. The bolts 33 of the retainer 32 extend through the inner fabric portion 72 of the inner tube 70 and the inner main body fabric portion 43 of the airbag main body 41. This secures the gas generator 30 to the airbag main body 41 and the inner tube 70 in a state where the position is determined with respect the airbag main body 41 and the inner tube 70. In this state, the gas outlet 31a at the lower end of the inflator 31 is located at the rear part of the upper-rear inflation chamber 103 and in the vicinity of the lower inflation chamber 101.

As shown in FIGS. 5 and 6, the lateral partition 50 and the inner tube 70 form an opening 80 and a check valve 81. The opening 80 is adapted to connect the lower inflation chamber 101 and the upper-rear inflation chamber 103 to each other. The second lateral joint portions 55 of the lateral partition 50 are disjoined from each other in the rear part of the lateral partition 50, more specifically, disjoined at the boundary with the extensions 52a, 53a. In other words, the second lateral joint portions 55, which join the fabric portions 52, 53 to each other, are absent in an area including the folding line 51. In this manner, the opening 80 is formed by disjoined parts of the fabric portions 52, 53 where the second lateral joint portions 55 are absent and the corresponding part of the inner tube 70. The check valve 81 regulates the flow of inflating gas through the opening 80. That is, the check valve 81 allows inflating gas to flow from the upper-rear inflation chamber 103 to the lower inflation chamber 101, but restricts the flow in the opposite direction, or the flow of inflation gas from the lower inflation chamber 101 to the upper-rear inflation chamber 103.

The front edges of the extensions 52a, 53a of the lateral partition 50, which is folded in half, and the front edges of the extensions 72a, 73a of the inner tube 70, which is also folded in half, are joined to each other by the first inclined joint portions 82 provided along the front edges. The upper ends of the first inclined joint portions 82 are connected to the rear ends of the second lateral joint portions 55.

Further, the rear parts of the extensions 52a, 53a of the lateral partition 50, which is folded in half, and the rear parts of the extensions 72a, 73a of the inner tube 70, which is also folded in half, are joined to each other by the second inclined joint portions 83 provided along the rear edges. The first inclined joint portions 82 and the second inclined joint portions 83 are both inclined rearward.

Parts of the extensions 52a, 53a, 72a, 73a that are behind the second inclined joint portions 83 are joined to the rear lower ends of the main body fabric portions 43, 44 by a part of the peripheral joint portion 45.

Parts of the extensions 52a, 53a, 72a, 73a that are surrounded by the opening 80, the first inclined joint portions 82, and the second inclined joint portions 83 form valve members 84 of the check valve 81.

The check valve 81 allows flow of inflation gas when one of the inner and outer valve members 84 is separated from the other. This state of the check valve 81 is referred to as a valve open state. The check valve 81 restricts flow of inflation gas when the inner and outer valve members 84 contact each other in at least parts thereof. This state of the check valve 81 is referred to as a valve closed state.

As shown in FIGS. 4 and 5, the airbag main body 41 has first and second vent holes 91, 93 for venting inflation gas in the inflation portion 49.

<Vent Holes 91, 93>

The main body fabric portions 43, 44 are not joined to each other at the front end of the upper-front inflation chamber 102. That is, the peripheral joint portion 45 has two first terminal portions 45a, which are separate from each other, at the front end of the upper-front inflation chamber 102. The airbag main body 41 has two first surrounding joint portions 92, which join the main body fabric portions 43, 44 to each other while surrounding the first terminal portions 45a. The area that is between the main body fabric portions 43, 44 and between the first surrounding joint portions 92 does not function to join the peripheral portions of the main body fabric portions 43, 44 to each other, but forms the first vent hole 91, which connects the inside and the outside of the upper-front inflation chamber 102 to each other. The inflation gas in the upper-front inflation chamber 102 is discharged to the outside through the first vent hole 91.

The main body fabric portions 43, 44 are not joined to each other at the front lower part of the lower inflation chamber 101. That is, the peripheral joint portion 45 has two second terminal portions 45*b*, which are separate from each other, at the front lower part of the lower inflation chamber 101. The airbag main body 41 has two second surrounding joint portions 94, which join the main body fabric portions 43, 44 to each other while surrounding the second terminal portions 45*b*. The area that is between the main body fabric portions 43, 44 and between the second surrounding joint portions 94 forms the second vent hole 93, which connects the inside and the outside of the lower inflation chamber 101 to each other. The inflation gas in the lower inflation chamber 101 is discharged to the outside through the second vent hole 93.

As shown in FIG. 3, the airbag module ABM includes as its main components the gas generator 30 and the airbag 40. The airbag module ABM is made compact as shown in FIG. 14 (hereinafter, referred to as a storage form) by folding the airbag main body 41 in the uninflated-and-spread state (see FIGS. 4 and 5). The airbag module ABM is folded in this manner in order that it is suitable for being stored in the storage portion 18, which has a limited size in the seat back 14.

The airbag module ABM in the storage form is obtained by performing a first folding operation and then second and third folding operations on the airbag main body 41 in the uninflated-spread state. With reference to FIGS. 10 to 14, each folding operation will be described. To identify the directions of folding, the words such as "forward,", "rearward," "upward," "downward," "inward," and "outward" are used on the assumption that the airbag 40 is installed in the automobile seat 12. FIGS. 10A, 11A, 12A, 13, and 14 illustrate the airbag module ABM in a state in which the folding line 42 of the airbag main body 41 extends vertically.

<First Folding Operation>

In the first folding operation, the airbag main body 41 in the uninflated-spread state is folded from the front end toward the rear end. The first folding operation includes accordion-folding and roll-folding. The accordion-folding is executed on a bag rear portion 41*r*, which is close to a part of the airbag main body 41 that surrounds the gas generator 30. The roll-folding is executed on a bag front portion 41*f*, which is located in front of and adjacent to the bag rear portion 41*r*. The bag rear portion 41*r* includes a rear part of the upper-rear inflation chamber 103 and a rear part of the lower inflation chamber 101. The bag front portion 41*f* includes an upper part of the upper-rear inflation chamber 103, most of the upper-front inflation chamber 102, and a part of the lower inflation chamber 101.

In the accordion-folding, a plurality of folding lines 105, which is parallel with the folding line 42, is defined on the bag rear portion 41*r* as shown in FIG. 10A. The distance between adjacent folding lines 105 corresponds to a folding width of the accordion-folding. Then, as shown in FIG. 10B, the rear part of the upper-rear inflation chamber 103 and the rear part of the lower inflation chamber 101 are accordion-folded along the folding lines 105. In other words, the bag rear portion 41*r* is repeatedly folded from the front end toward the rear end by a constant width while alternating the folding direction (see the long dashed double-short dashed line in FIG. 10B).

In the roll-folding, a plurality of folding lines 106, which is parallel with the folding line 42, is defined on the bag front portion 41*f* as shown in FIG. 11A. The bag front portion 41*f* is spirally and successively folded from the front end toward the rear end along the folding lines 106 (see the long dashed double-short dashed line in FIG. 11A). In other words, the bag front portion 41*f* is repeatedly folded in the same direction.

Each portion of the bag rear portion 41*r* between adjacent two folding lines 105 and each portion of the bag front portion 41*f* between adjacent two folding lines 106 will be structural segments 108 of a stacked portion 107, which will be discussed below.

As a result, as shown in FIGS. 12A and 12B, the bag rear portion 41*r*, which has been accordion-folded, is located in front of the gas generator 30, and the bag front portion 41*f*, which has been roll-folded, is located in front of the bag rear portion 41*r*.

The order in which the accordion-folding and the roll-folding are performed is not limited. For example, the accordion-folding and the roll-folding may be executed simultaneously. After the first folding operation (the accordion-folding and the roll-folding) is performed, the airbag main body 41 is turned into a transitional form, which is small in the front-rear direction and elongated in the vertical direction as shown in FIGS. 12A and 12B.

The airbag main body 41 in the transitional form includes the elongated stacked portion 107. The stacked portion 107 includes structural segments 108, which respectively extend vertically. The structural segments 108 are stacked in the thickness direction.

The stacked portion 107 includes a first stacked section 107*a*, which forms a lower part, and a second stacked section 107*b*, which forms a part above the first stacked section 107*a* and accommodates the gas generator 30. When deployed and inflated, the first stacked section 107*a* forms a most part of the lower inflation chamber 101. When deployed and inflated, the second stacked section 107*b* forms a most part of the upper inflation chamber.

<Second Folding Operation>

In the second folding operation, the first stacked section 107*a* is folded in the stacked portion 107. Specifically, a folding line 111, which extends in a direction perpendicular to the folding line 42 (the automobile width direction) is defined in the boundary between the first stacked section 107*a* and the second stacked section 107*b* in the elongated stacked portion 107.

As indicated by an arrow in FIG. 12A, the first stacked section 107*a* is folded back forward and upward about the folding line 111. As shown in FIG. 13, folding lines 112, 113, which extend in a direction perpendicular to the folding line 42 (the automobile width direction) are defined at vertically separated two positions on the folded back first stacked section 107*a*. The first stacked section 107*a* is folded back forward and downward about the folding line 112 and is folded back rearward and upward about the folding line 113. These folding actions form three bent sections along the flowing direction of inflation gas in the first stacked section 107*a* as shown in FIG. 14.

In the first stacked section 107*a*, the inflation gas first flows through the bent section adjacent to and on the downstream side in the inflation gas flowing direction of the second stacked section 107*b*. Thereafter, the inflation gas sequentially flows through the remaining two bent sections on the downstream side in the inflation gas flowing direction. To distinguish the three bent sections, the bent section located at the most upstream position in the gas flowing direction will be referred to as an upstream bent section 114. The bent section located at the most downstream position will be referred to as a downstream bent section 116. The bent section between the upstream bent section 114 and the downstream bent section 116 will be referred to as an intermediate bent section 115.

As shown in FIG. 14, the upstream bent section 114 is arranged in front of and adjacent to the lower part of the second stacked section 107*b*. The intermediate bent section 115 is arranged in front of and adjacent to the upstream bent section 114. The downstream bent section 116 is arranged behind and adjacent to the lower part of the second stacked section 107*b*.

The folding at the above illustrate two positions reduces the vertical dimension of the first stacked section 107*a*.

<Third Folding Operation>

In the third folding operation, the upper part of the second stacked section 107*b* is folded back forward or rearward. In the present embodiment, as shown in FIG. 13, a folding line 117, which extends in a direction perpendicular to the folding line 42 (the automobile width direction) is defined in a part of the second stacked section 107*b* that is above the gas generator 30. The part of the second stacked section 107*b* that is above the folding line 117 is folded back rearward and downward about the folding line 117 as indicated by the arrow in FIG. 13.

After the first folding operation, the airbag main body 41 is in the transitional form. At this stage, the vertically elongated stacked portion 107 is formed in most part of the airbag main body 41. After the second and third folding operations, the airbag main body 41 is turned into the storage form, which has a reduced dimension in the front-rear direction and a reduced dimension in the vertical direction and is suitable for being stored in the narrow storage portion 18 as shown in FIG. 14.

The third folding operation may be performed substantially simultaneously with, before, or after the second folding operation.

Thereafter, the airbag main body 41 in the storage form is retained in the storage form by a retaining means, such as a binding tape (not shown).

As shown in FIG. 3, the airbag module ABM with the airbag main body 41 in the storage form is stored in the storage portion 18. The bolts 33, which extend from the gas generator 30 and are passed through the inner fabric portion 72 of the inner tube 70 and the inner main body fabric portion 43 of the airbag main body 41, are passed through the side frame portion 15 from the outer side. Nuts 35 are threaded to the bolts 33 from the inner side. This secures the gas generator 30 to the side frame portion 15 together with the rear end of the airbag main body 41 and the inner tube 70.

The gas generator 30 may be fixed to the side frame portion 15 using members other than the bolts 33 and the nuts 35.

As shown in FIG. 1, the side airbag apparatus includes an impact sensor 121 and a controller 122 in addition to the airbag module ABM. The impact sensor 121 includes an acceleration sensor and is provided on the body side portion 11 of the automobile 10 (see FIG. 2) to detect an impact applied to the body side portion 11 from the side. The controller 122 controls operation of the gas generator 30 based on a detection signal from the impact sensor 121.

The automobile 10 is equipped with a seat belt apparatus for restraining the occupant P seated in the automobile seat 12. However, illustration of the seat belt apparatus is omitted, for example, in FIG. 1.

Operation of the side airbag apparatus according to the above-described embodiment will now be described.

As shown in FIGS. 1 and 2, when the impact sensor 121 does not detect any impact from the side of the body side portion 11, the controller 122 does not output an activation signal to the gas generator 30 to activate the gas generator 30. Thus, the gas generator 30 does not discharge inflation gas. As shown in FIG. 3, the airbag main body 41 remains stored in the storage portion 18 in the storage form.

In contrast, when the impact sensor 121 detects that an impact of a magnitude greater than or equal to a predetermined value has been applied to the body side portion 11 due to a side collision or the like while the automobile 10 is traveling, the controller 122, based on the detection signal, outputs an activation signal for activating the gas generator 30 to the gas generator 30. In response to the activation signal, the inflator 31 discharges inflating gas through the gas outlet 31*a*. The discharged inflation gas is divided into portions delivered upward and downward by the inner tube 70.

The gas outlet 31*a* is located at the lower end of the inflator 31. The part of the inflator 31 above the gas outlet 31*a* is formed to have a larger diameter than the gas outlet 31*a* and acts to prevent the upward flow of the inflation gas. Thus, a greater amount of the inflation gas discharged from the gas outlet 31*a* flows downward than upward. The inflation gas that has been delivered upward is supplied to the upper-rear inflation chamber 103 from the upper end of the inner tube 70. The inflation gas thus increases the internal pressure of the upper-rear inflation chamber 103, so that the upper-rear inflation chamber 103 starts being inflated.

The inflation gas delivered downward is supplied to the check valve 81. During the period in which the inflation gas is being supplied to the check valve 81, a force is generated that acts to turn the inner and outer valve members 84 into a tubular shape. This force opens the check valve 81. Thus, the inflation gas passes between the inner and outer valve members 84 and flows into the lower inflation chamber 101. The inflation gas thus increases the internal pressure of the lower inflation chamber 101, so that the lower inflation chamber 101 starts being inflated.

Continuous supply of the inflation gas from the gas generator 30 increases the internal pressures of the upper-rear inflation chamber 103 and the lower inflation chamber 101. Since the lower inflation chamber 101 receives a greater amount of inflation gas than the upper-rear inflation chamber 103, the internal pressure of the lower inflation chamber 101 becomes higher than that of the upper-rear inflation chamber 103. Inflation of the upper-rear inflation chamber 103 and the lower inflation chamber 101 strains the vertical partition 60 and the lateral partition 50 in the automobile width direction (see FIG. 9B).

As the inflation of the upper-rear inflation chamber 103 progresses, some of the inflation gas in the upper-rear inflation chamber 103 flows out to the upper-front inflation chamber 102 via the communication portions 66, so that the upper-front inflation chamber 102 starts inflating with a delay from the upper-rear inflation chamber 103.

The lower inflation chamber 101, the upper-rear inflation chamber 103, and the upper-front inflation chamber 102 are unfolded in the reverse order of that when these were folded. The airbag main body 41, which is deployed and inflated in the above described manner, pushes the seat pad 16 of the seat back 14, so that the seat pad 16 is broken at the breakable portion 21 (see FIG. 3). As shown in FIG. 15, the airbag main body 41 is projected forward from the seat back 14 through the broken area while part of the airbag main body 41 is remaining in the storage portion 18.

The airbag main body 41, which continues being supplied with inflation gas, is deployed while being unfolded forward between the body side portion 11 and the upper body of the occupant P seated in the automobile seat 12 as indicated by long dashed double-short dashed lines in FIGS. 1 and 2.

As shown in FIG. 5, among the inflation chambers 101 to 103, the lower inflation chamber 101, the internal pressure of which is the highest, is deployed and inflated beside the lumbar region PP, which is has the highest impact resistance in the side of the upper body of the occupant P. The upper-rear inflation chamber 103, the internal pressure of which is the second highest after the lower inflation chamber 101, is deployed and inflated beside the shoulder region PS and the rear half of the thorax region PT, each of which has a higher impact resistance than the front half of the thorax region PT. The upper-front inflation chamber 102, the internal pressure of which is lower than the upper-rear inflation chamber 103, is deployed and inflated beside the front half of the thorax region PT, which has a lower impact resistance than the shoulder region PS and the rear half of the thorax region PT.

The upper body of the occupant (the lumbar region PP, the shoulder region PS, and the thorax region PT) is restrained by the lower inflation chamber 101, the upper-rear inflation chamber 103, and the upper-front inflation chamber 102 with a pressure distribution appropriate for the respective impact resistances. As a result, the impact from the side, which is transmitted via the body side portion 11, is mitigated by the lower inflation chamber 101, the upper-rear inflation chamber 103, and the upper-front inflation chamber 102, so that the lumbar region PP, the shoulder region PS, and the thorax region PT are protected.

In a configuration in which the upper inflation chamber is constituted by a single cell, the upper inflation chamber is deployed and inflated forward all at once with momentum. In contrast, in the present embodiment, the upper inflation chamber is formed by the upper-rear inflation chamber 103 and the upper-front inflation chamber 102. Thus, in the present embodiment, the upper inflation chamber is deployed and inflated forward in two steps in the order of the upper-rear inflation chamber 103 and the upper-front inflation chamber 102. Thus, even if an obstacle exists in front of the airbag main body 41, the obstacle will not be thrust upon by the airbag main body 41 as the airbag main body 41 is deployed.

When discharge of inflation gas from the inflator 31 stops and the inflation gas in the lower inflation chamber 101 acts to flow to the upper-rear inflation chamber 103, the inner and outer valve members 84 of the check valve 81 are pushed by the high pressure in the lower inflation chamber 101 and contact each other. The check valve 81 is thus closed and restricts the inflation gas in the lower inflation chamber 101 from flowing out to the upper-rear inflation chamber 103 through between the inner and outer valve members 84. Therefore, the internal pressure of the lower inflation chamber 101, which has been increased to a level adequate for protecting the lumbar region PP of the occupant P, or an internal pressure higher than that of the upper-rear inflation chamber 103, is restrained from being reduced by outflow of the inflation gas.

Surplus inflation gas in the lower inflation chamber 101 is discharged to the outside through the second vent hole 93. Also, surplus inflation gas in the upper-front inflation chamber 102 is discharged to the outside through the first vent hole 91. In this manner, when the occupant P is restrained by the airbag main body 41, the internal pressures of the lower inflation chamber 101 and the upper inflation chamber are lowered, so that the upper body of the occupant P is pushed with an adequate pressing force.

The restraint and protection of the occupant P by the airbag main body 41 and the basic restriction of thrust on an obstacle are performed as described above. Further, in the present embodiment, the manner in which the airbag main body 41 is folded is contrived, so that unfolding takes place in a characteristic manner. Thus, various operations described below are executed, which include restriction of thrust on an obstacle.

The inflation gas discharged from the gas outlet 31a of the inflator 31 flows through the second stacked section 107b and the first stacked section 107a in that order in the stacked portion 107 of the airbag main body 41 in the storage form as shown in FIGS. 16A and 16B. In the first stacked section 107a, the inflation gas first flows through the upstream bent section 114, which is adjacent to and on the downstream side in the inflation gas flowing direction of the second stacked section 107b. Subsequently, the inflation gas flows through the intermediate bent section 115, which is adjacent to and on the downstream side in the inflation gas flowing direction of the upstream bent section 114. The inflation gas then flows through the downstream bent section 116, which is on the downstream side of the intermediate bent section 115.

In the present embodiment, among the bent sections 114 to 116 in the first stacked section 107a, the two bent sections (the upstream bent section 114 and the intermediate bent section 115) are located in front of the second stacked section 107b. Of these two bent sections, the upstream bent section 114, which is adjacent to and on the downstream side in the inflation gas flowing direction of the second stacked section 107b, acts to pivot forward and downward in front of the second stacked section 107b about the boundary between the upstream bent section 114 and the second stacked section 107b (the folding line 111). Also, the intermediate bent section 115, which is adjacent to and on the downstream side in the inflation gas flowing direction of the upstream bent section 114, acts to pivot forward and upward in front of the second stacked section 107b about the boundary between the intermediate bent section 115 and the upstream bent section 114 (the folding line 112). With the above described pivoting motions, the structural segments 108 in the upstream bent section 114 and the intermediate bent section 115 act to be deployed and inflated forward in front of the second stacked section 107b.

However, among the bent sections 114 to 116 in the first stacked section 107a, the downstream bent section 116, which is located behind the second stacked section 107b, is located downstream of the upstream bent section 114 and the intermediate bent section 115, which are located in front of the second stacked section 107b. That is, the inflation gas reaches the downstream bent section 116 after flowing through the upstream bent section 114 and the intermediate bent section 115. Thus, until the inflation gas reaches the downstream bent section 116, the downstream bent section 116 acts to prevent the upstream bent section 114 and the intermediate bent section 115, which are located in front of the second stacked section 107b, from pivoting forward as shown in FIGS. 16A and 16B.

Thus, the momentum of the forward deployment and inflation of the structural segments 108 in the upstream bent section 114 and the intermediate bent section 115 are reduced compared to a case in which pivoting motion of the bent sections 114 to 116 are not hindered, and, among the structural segments 108 in the first stacked section 107a, the structural segments 108 in the upstream bent section 114 and the intermediate bent section 115, which are located in front of the second stacked section 107b, are deployed and inflated forward.

Specifically, as shown in FIGS. 17A and 17B, the momentum of the forward and downward pivoting motion of the upstream bent section 114 is reduced, and the momentum of the forward and upward pivoting motion of the intermediate bent section 115 is also reduced. This also reduces the momentum of the deployment and inflation of the structural segments 108, which take place on the basis of pivoting motion of the upstream bent section 114 and the intermediate bent section 115.

As shown in FIGS. 18A and 18B, when pivoting motion of the upstream bent section 114 and the intermediate bent section 115 progresses and the inflation gas reaches the downstream bent section 116, the downstream bent section 116 acts to pivot behind and below the second stacked section 107b about the boundary between the downstream bent section 116 and the intermediate bent section 115 (the folding line 113).

In the bent sections 114 to 116, in which pivoting motion has progressed in the above described manner, the structural segments 108 are deployed and inflated behind and below the second stacked section 107b as shown in FIGS. 19A and 19B as the bent sections 114 to 116 pivot. Subsequently, the structural segments 108 are deployed and inflated in front of the second stacked section 107b.

The momentum of the forward deployment and inflation of the structural segments 108 is reduced as described above. Thus, compared to the configuration in which the structural segments 108 in the first stacked section 107a are not deployed and inflated behind or below the second stacked section 107b, and the structural segments 108 are deployed and inflated forward only in front of the second stacked section 107b, the momentum of the forward deployment and inflation of the structural segments 108 is reduced.

In the configuration in which the first stacked section 107a is long but includes only one bent section, and the first stacked section 107a pivots about the boundary between the first stacked section 107a and the second stacked section 107b as in Japanese Laid-Open Patent Publication No. 2008-87632, the bent sections 114 to 116 are likely to be deployed and inflated to the front side of the second stacked section 107b without being sufficiently deployed and inflated behind and below the second stacked section 107b.

In contrast, the short bent sections 114 to 116 are each pivoted in the present embodiment, in which the first stacked section 107a has the bent sections 114 to 116. The structural segments 108 in the respective bent sections 114 to 116 are deployed and inflated forward in front of the second stacked section 107b after being greatly deployed and inflated behind and below the second stacked section 107b.

The pivoting motion of the bent sections 114 to 116 in the first stacked section 107a and the accompanying deployment and inflation of the structural segments 108 in the respective bent sections 114 to 116 are influenced by the deployment and inflation of the upper inflation chamber. This is because the first stacked section 107a, which constitutes the lower part of the stacked portion 107, is deployed and inflated to form the most part of the lower inflation chamber 101 and the lower inflation chamber 101 is adjacent to the upper inflation chamber with the lateral partition 50 in between.

As described above, in the upper inflation chamber, the upper-rear inflation chamber 103 first starts being deployed and inflated. The upper-rear inflation chamber 103 is deployed and inflated in the rear half of the deployment region Z1. Then, the upper-front inflation chamber 102 starts being deployed and inflated after a delay from the starting of deployment and inflation of the upper-rear inflation chamber 103 (FIG. 19B). Thus, among the pivoting motion of the bent sections 114 to 116 in the first stacked section 107a and the accompanying deployment and inflation of the structural segments 108 in the respective bent sections 114 to 116, the forward movements are restricted by the upper-rear inflation chamber 103, which is deployed and inflated (FIG. 19A).

The present embodiment as described above achieves the following advantages.

(1) The airbag main body 41 forms the outer shape of the airbag 40 and is stored in the storage portion 18 in the storage form. The stacked portion 107 is formed by vertically extending structural segments 108, which are stacked in the thickness direction. Also, the stacked portion 107 includes the first stacked section 107a, which forms the lower part, and the second stacked section 107b, which forms the part above the first stacked section 107a and accommodates the gas generator 30 (FIGS. 12A and 12B). When the airbag main body 41 is in the storage form, the first stacked section 107a has the bent sections 114 to 116 arranged along the inflation gas flowing direction. Among the bent sections 114 to 116, the downstream bent section 116, which is located at the most downstream position in the inflation gas flowing direction, is located behind the second stacked section 107b (FIG. 14).

Thus, even if the stacked portion 107 of the airbag main body 41 is long and the first stacked section 107a is long accordingly, it is possible to restrain the structural segments 108 in the first stacked section 107a from being deployed and inflated forward with momentum and projecting forward beyond the deployment region Z1.

(2) In the airbag main body 41 in the storage form, among the bent sections 114 to 116 in the first stacked section 107a, the upstream bent section 114 and the intermediate bent section 115, which are different from the bent section 116 located at the most downstream position in the inflation gas flowing direction, are located in front of the second stacked section 107b (FIG. 14).

Thus, the downstream bent section 116 reduces the momentum of forward and downward pivoting motion of the upstream bent section 114, thereby reducing the momentum of the forward and upward pivoting motion of the intermediate bent section 115. This also reduces the momentum of the deployment and inflation of the structural segments 108, which take place on the basis of pivoting motion of the upstream bent section 114 and the intermediate bent section 115.

As a result, among the bent sections 114 to 116 in the first stacked section 107a, the structural segments 108 in the upstream bent section 114 and the intermediate bent section 115, which are located in front of the second stacked section 107b, are restrained from being deployed and inflated forward with momentum and projecting forward beyond the deployment region Z1.

(3) The gas generator 30 includes the vertically extending elongated inflator 31. The inflator 31 has the gas outlet 31a for discharging inflation gas at the lower end. The inner tube 70 has a vertically extending tubular shape with open upper and lower ends and surrounds the gas generator 30 (FIGS. 3 and 4).

Thus, a greater amount of the inflation gas discharged from the gas outlet 31a flows downward in the inner tube 70 than upward. That is, the inflation gas is preferentially supplied to the lower inflation chamber 101 over the upper-rear inflation chamber 103. When deployed and inflated, the lower part of the airbag main body 41 is likely to project forward beyond the deployment region Z1.

Thus, among the bent sections 114 to 116, positioning the downstream bent section 116, which is located at the most downstream position, behind the second stacked section 107b is particularly effective in restraining the structural segments 108 in the first stacked section 107a from being deployed and inflated forward with momentum and projecting further forward than the deployment region Z1.

(4) The airbag main body 41 incorporates the check valve 81 (FIG. 5), which restricts the inflation gas in the lower inflation chamber 101 from flowing out to the upper inflation chamber (the upper-rear inflation chamber 103).

Thus, the internal pressure of the lower inflation chamber 101, which corresponds to the first stacked section 107a, is likely to be increased and the lower part of the airbag main body 41 is likely to project forward beyond the deployment region Z1 when being deployed and inflated.

However, the inflation gas that flows through the second stacked section 107b and the first stacked section 107a in the order to cause the bent sections 114 to 116 to pivot in the above described manner in the first stacked section 107a. Accordingly, the structural segments 108 in the bent sections 114 to 116 are deployed and inflated.

Thus, the momentum of the forward deployment and inflation of the structural segments 108 is reduced compared to a configuration in which the structural segments 108 in the first stacked section 107a are not deployed or inflated behind or below the second stacked section 107b, and the structural segments 108 are deployed and inflated only in front of the second stacked section 107b. As a result, the structural segments 108 in the first stacked section 107a are effectively restrained from being deployed and inflated forward with momentum and projecting forward beyond the deployment region Z1.

(5) The airbag main body 41 incorporates the vertical partition 60, which has the communication portions 66. The upper inflation chamber is divided into the upper-rear inflation chamber 103 and the upper-front inflation chamber 102 by the vertical partition 60. The upper-rear inflation chamber 103 receives inflation gas from the gas generator 30. The upper-front inflation chamber 102 is located in front of the upper-rear inflation chamber 103 and receives inflation gas via the communication portions 66 (FIG. 5).

Thus, among the pivoting motion of the bent sections 114 to 116 in the first stacked section 107a and the accompanying deployment and inflation of the structural segments 108 in the respective bent sections 114 to 116, the forward movements are restricted by the upper-rear inflation chamber 103, which is deployed and inflated in the rear half of the deployment region Z1.

Thus, compared to a case in which the upper inflation chamber is not divided by the vertical partition 60 and is configured by a single cell, the structural segments 108 in the first stacked section 107a are further effectively restrained from being deployed and inflated forward with momentum and projecting forward beyond the deployment region Z1.

The above-described embodiment may be modified as follows.

<Regarding the Storage Portion 18 of the Airbag Module ABM>

Instead of the seat back 14 of the automobile seat 12, the storage portion 18 may be located in the body side portion 11 to incorporate the airbag module ABM.

<Regarding the Inflation Portion 49>

Substantially the entire airbag main body 41 may be configured to be inflated by the inflation portion 49 as in the above-illustrated embodiment, but may also partially include a non-inflation portion, which is neither supplied with inflation gas nor inflated.

<Regarding the Vertical Partition 60>

The vertical partition 60 may have a shape different from that in the above illustrated embodiment. In this case, the shape of the vertical partition 60 is preferably changed in accordance with the location of the upper body of the occupant P to be restrained and protected by the upper-rear inflation chamber 103. For example, the upper parts of the fabric pieces 61, 62 of the vertical partition 60 do not necessarily need to be inclined but may extend substantially vertically.

The vertical partition 60 may be omitted. That is, the upper inflation chamber may be undivided and constituted by a single cell. Even in this case, since the inflation gas is preferentially supplied to the lower inflation chamber 101 over the upper inflation chamber, the advantages similar to the above illustrated embodiment will be achieved.

<Regarding the First Stacked Section 107a>

The first stacked section 107a may include a greater number of bent sections than the above illustrated embodiment. The additional bent sections may be arranged in front of or behind the second stacked section 107b. The bent section that is located at the most downstream position in the inflation gas flowing direction is located behind the second stacked section 107b.

As shown in FIGS. 20A, 20B, 21A, and 21B, the first stacked section 107a may be formed by two bent sections, which are an upstream bent section 118 and a downstream bent section 119, and the bent sections 118, 119 may be arranged behind the second stacked section 107b.

In the modification of FIGS. 20A and 20B, the upstream bent section 118 in the first stacked section 107a, which is located on the upstream side, is arranged between the downstream bent section 119 and the second stacked section 107b.

In this case, the upstream bent section 118 acts to pivot rearward and downward behind and below the second stacked section 107b about the boundary between the upstream bent section 118 and the second stacked section 107b. The downstream bent section 119 acts to pivot rearward and upward behind and below the second stacked section 107b about the boundary between the downstream bent section 119 and the upstream bent section 118. During these pivoting motions, the structural segments 108 in the upstream bent section 118 and the downstream bent section 119 are deployed and inflated behind and below the second stacked section 107b and are subsequently deployed and inflated forward in front of the second stacked section 107b.

In the modification of FIGS. 21A and 21B, the downstream bent section 119 in the first stacked section 107a is arranged between the upstream bent section 118 and the second stacked section 107b.

In this case, the upstream bent section 118 acts to pivot rearward and downward behind and below the second stacked section 107b about the boundary between the upstream bent section 118 and the second stacked section 107b. The downstream bent section 119 acts to pivot forward and upward behind and below the second stacked section 107b about the boundary between the downstream bent section 119 and the upstream bent section 118. During these pivoting motions, the structural segments 108 in the upstream bent section 118 and the downstream bent section 119 are deployed and inflated behind and below the second stacked section 107b and are subsequently deployed and inflated forward in front of the second stacked section 107b.

Thus, in any of the above modifications, the momentum of the forward deployment and inflation of the structural segments 108 is reduced compared to the configuration in which the structural segments 108 in the first stacked section 107a are not deployed or inflated behind or below the second stacked section 107b, and the structural segments 108 are deployed and inflated only in front of the second stacked section 107*b*. As a result, as in the above illustrated embodiment, the structural segments 108 in the first stacked section 107*a* are restrained from being deployed and inflated forward with momentum and projecting forward beyond the deployment region Z1.

The first stacked section 107*a* may include a greater number of bent sections than the above illustrated modifications. However, the additional bent sections are arranged behind the second stacked section 107*b* as the other bent sections.

<Other Modifications>

In the above illustrated embodiment, the vertical partition 60 may include a pressure regulator valve that adjusts the opening degree of the communication portion 66 to regulate the internal pressures of the upper-rear inflation chamber 103 and the upper-front inflation chamber 102.

The present invention may be applied to a side airbag apparatus of an automobile in which the seat 12 is arranged such that the seat back 14 faces in a direction other than the forward direction, for example, sideways. In this case, when an impact is applied to the automobile from the side of the automobile seat 12 (in the front-rear direction of the automobile), the side airbag apparatus protects the occupant P from the impact.

Automobiles to which the side airbag apparatus according to the present invention is applied include various industrial vehicles in addition to private cars.

The present invention can be applied to side airbag apparatuses that are mounted on vehicles other than automobiles, for example, airplanes, boats, and ships and protect occupants seated in vehicle seats from impacts.

The invention claimed is:

1. A side airbag apparatus comprising:
   a gas generator, which discharges inflation gas in response to an impact applied to a vehicle seat from a side;
   an airbag main body, which is stored in a storage portion provided beside an occupant seated in the vehicle seat and is configured to be deployed and inflated by the inflation gas in a deployment region beside the occupant, wherein the airbag main body is stored in the storage portion in a storage form;
   a lateral partition, which is arranged in the airbag main body and divides at least a part of an interior of the airbag main body into an upper inflation chamber and a lower inflation chamber, which is located below the upper inflation chamber, wherein the lateral partition is joined to the airbag main body by a first lateral joint portion; and
   an inner tube, which is arranged in the airbag main body and guides the inflation gas from the gas generator to the upper inflation chamber and the lower inflation chamber such that the inflation gas is preferentially supplied to the lower inflation chamber over the upper inflation chamber, wherein
   the airbag main body includes an elongated stacked portion,
   the stacked portion is formed by vertically extending structural segments, which are stacked in a thickness direction of the structural segments,
   the stacked portion includes a first stacked section, which forms a lower part, and a second stacked section, which forms a part above the first stacked section and accommodates the gas generator,
   in the storage form, the first stacked section includes a plurality of bent sections arranged along a flowing direction of inflation gas,
   among the bent sections, the bent section that is located at the most downstream position in the inflation gas flowing direction is a downstream bent section,
   among the bent sections, the bent section that is located at the most upstream position in the inflation gas flowing direction is an upstream bent section,
   the bent sections include an intermediate bent section, which is adjacent to and on a downstream side in the inflation gas flowing direction of the upstream bent section,
   among the bent sections, at least the downstream bent section is arranged behind the second stacked section,
   a boundary between the upstream bent section and the intermediate bent section is defined by a folding line, and
   the folding line is located above the first lateral joint portion.

2. The side airbag apparatus according to claim 1, wherein, among the bent sections, at least one of the bent sections other than the downstream bent section is arranged in front of the second stacked section.

3. The side airbag apparatus according to claim 1, wherein all the bent sections are arranged behind the second stacked section.

4. The side airbag apparatus according to claim 1, wherein
   the gas generator includes an elongated inflator, which extends vertically,
   the inflator includes a lower end and a gas outlet, which is provided at the lower end and discharges the inflation gas, and
   the inner tube extends vertically and has a cylindrical shape with open upper and lower ends, wherein the inner tube surrounds the inflator.

5. The side airbag apparatus according to claim 1, further comprising a check valve, which is provided in the airbag main body, wherein the check valve restricts inflation gas in the lower inflation chamber from flowing out to the upper inflation chamber.

6. The side airbag apparatus according to claim 1, further comprising a vertical partition, which is provided in the airbag main body and has a communication portion,
   wherein the upper inflation chamber is divided into an upper-rear inflation chamber and an upper-front inflation chamber by the vertical partition, wherein the inflation gas from the gas generator is supplied to the upper-rear inflation chamber, and the upper-front inflation chamber is located in front of the upper-rear inflation chamber and receives inflation gas via the communication portion.

7. A side airbag apparatus comprising:
   a gas generator, which discharges inflation gas in response to an impact applied to a vehicle seat from a side;
   an airbag main body, which is stored in a storage portion provided beside an occupant seated in the vehicle seat and is configured to be deployed and inflated by the inflation gas in a deployment region beside the occupant, wherein the airbag main body is stored in the storage portion in a storage form;
   a lateral partition, which is arranged in the airbag main body and divides at least a part of an interior of the airbag main body into an upper inflation chamber and a lower inflation chamber, which is located below the upper inflation chamber; and
   an inner tube, which is arranged in the airbag main body and guides the inflation gas from the gas generator to the upper inflation chamber and the lower inflation chamber such that the inflation gas is preferentially supplied to the lower inflation chamber over the upper inflation chamber, wherein the airbag main body includes an elongated stacked portion, the stacked portion is formed by vertically extending structural segments, which are stacked in a thickness direction of the structural segments, the stacked portion includes a first stacked section, which forms a lower part, and a second stacked section, which forms a part above the first stacked section and accommodates the gas generator, in the storage form, the first stacked section includes a plurality of bent sections arranged along a flowing direction of inflation gas, among the bent sections, the bent section that is located at the most downstream position in the inflation gas flowing direction is a downstream bent section, among the bent sections, the bent section that is located at the most upstream position in the inflation gas flowing direction is an upstream bent section, the bent sections include an intermediate bent section located between the upstream bent section and the downstream bent section, the downstream bent section is arranged behind the second stacked section, the upstream bent section is arranged in front of the second stacked section, and the intermediate bent section is arranged in front of the upstream bent section.

8. The side airbag apparatus according to claim 7, wherein, among the bent sections, at least one of the bent sections other than the downstream bent section is arranged in front of the second stacked section.

9. The side airbag apparatus according to claim 7, wherein all the bent sections are arranged behind the second stacked section.

10. The side airbag apparatus according to claim 7, wherein the gas generator includes an elongated inflator, which extends vertically, the inflator includes a lower end and a gas outlet, which is provided at the lower end and discharges the inflation gas, and the inner tube extends vertically and has a cylindrical shape with open upper and lower ends, wherein the inner tube surrounds the inflator.

11. The side airbag apparatus according to claim 7, further comprising a check valve, which is provided in the airbag main body, wherein the check valve restricts inflation gas in the lower inflation chamber from flowing out to the upper inflation chamber.

12. The side airbag apparatus according to claim 7, further comprising a vertical partition, which is provided in the airbag main body and has a communication portion, wherein the upper inflation chamber is divided into an upper-rear inflation chamber and an upper-front inflation chamber by the vertical partition, wherein the inflation gas from the gas generator is supplied to the upper-rear inflation chamber, and the upper-front inflation chamber is located in front of the upper-rear inflation chamber and receives inflation gas via the communication portion.

* * * * *